(12) United States Patent
Whitaker et al.

(10) Patent No.: US 10,781,524 B2
(45) Date of Patent: Sep. 22, 2020

(54) METHODS OF PREPARING ARTICLES BY ELECTRODEPOSITION AND ADDITIVE MANUFACTURING PROCESSES

(71) Applicant: Modumetal, Inc., Seattle, WA (US)

(72) Inventors: John D. Whitaker, Seattle, WA (US); Richard J. Caldwell, Lynnwood, WA (US); Chad Jennings, Seattle, WA (US)

(73) Assignee: MODUMETAL, INC., Seattle, WA (US)

( * ) Notice: Subject to any disclaimer, the term of this patent is extended or adjusted under 35 U.S.C. 154(b) by 364 days.

(21) Appl. No.: 15/464,224

(22) Filed: Mar. 20, 2017

(65) Prior Publication Data

US 2017/0191177 A1 Jul. 6, 2017

Related U.S. Application Data

(63) Continuation of application No. PCT/US2015/050920, filed on Sep. 18, 2015.
(Continued)

(51) Int. Cl.
*B32B 3/10* (2006.01)
*C25D 1/20* (2006.01)
(Continued)

(52) U.S. Cl.
CPC .............. *C25D 1/20* (2013.01); *B22F 3/1055* (2013.01); *B22F 3/24* (2013.01); *B22F 7/04* (2013.01); *B23K 26/342* (2015.10); *B23K 26/70* (2015.10); *B33Y 10/00* (2014.12); *B33Y 40/00* (2014.12); *B33Y 80/00* (2014.12); *C23C 18/1641* (2013.01); *C23C 18/1653* (2013.01); *C23C 18/1657* (2013.01); *C23C 18/1689* (2013.01); *C23C 18/31* (2013.01); *C25D 1/00* (2013.01); *C25D 1/003* (2013.01); *C25D 3/12* (2013.01); *C25D 5/022* (2013.01); *C25D 5/08* (2013.01); *C25D 5/10* (2013.01); *C25D 5/12* (2013.01);
(Continued)

(58) Field of Classification Search
None
See application file for complete search history.

(56) References Cited

U.S. PATENT DOCUMENTS 2,428,033 A 9/1947 Nachtman
2,436,316 A 2/1948 Lum et al.
(Continued)

FOREIGN PATENT DOCUMENTS

CN 1380446 A 11/2002
CN 1924110 A 3/2007
(Continued)

OTHER PUBLICATIONS

Harris et al., "Improved Single Crystal Superalloys, CMSX-4® (SLS)[La+Y] and CMSX-486®," *TMS (The Minerals, Metals & Materials Society)*, Superalloys, pp. 45-52, 2004.
(Continued)

*Primary Examiner* — Christopher M Polley
(74) *Attorney, Agent, or Firm* — Seed Intellectual Property Law Group LLP

(57) ABSTRACT

Articles prepared by additive manufacturing of preforms that are coated by electrodeposition of nanolaminate materials, and methods of their production are described.

20 Claims, 2 Drawing Sheets

Related U.S. Application Data

(60) Provisional application No. 62/052,428, filed on Sep. 18, 2014.

(51) Int. Cl.

| | |
|---|---|
| *C23C 18/16* | (2006.01) |
| *C25D 21/10* | (2006.01) |
| *C25D 17/00* | (2006.01) |
| *C25D 5/14* | (2006.01) |
| *C25D 5/18* | (2006.01) |
| *C25D 5/10* | (2006.01) |
| *C25D 1/00* | (2006.01) |
| *C25D 5/02* | (2006.01) |
| *C25D 17/12* | (2006.01) |
| *B33Y 10/00* | (2015.01) |
| *B33Y 40/00* | (2020.01) |
| *B33Y 80/00* | (2015.01) |
| *B23K 26/342* | (2014.01) |
| *B23K 26/70* | (2014.01) |
| *B22F 3/105* | (2006.01) |
| *B22F 3/24* | (2006.01) |
| *B22F 7/04* | (2006.01) |
| *C23C 18/31* | (2006.01) |
| *C25D 3/12* | (2006.01) |
| *C25D 5/08* | (2006.01) |
| *C25D 5/12* | (2006.01) |
| *C25D 5/56* | (2006.01) |
| *C23C 18/24* | (2006.01) |

(52) U.S. Cl.
CPC ................. *C25D 5/14* (2013.01); *C25D 5/18* (2013.01); *C25D 5/56* (2013.01); *C25D 17/007* (2013.01); *C25D 17/008* (2013.01); *C25D 17/12* (2013.01); *C25D 21/10* (2013.01); *B22F 2003/242* (2013.01); *B22F 2007/042* (2013.01); *B22F 2998/10* (2013.01); *C23C 18/1666* (2013.01); *C23C 18/24* (2013.01)

(56) References Cited

U.S. PATENT DOCUMENTS

| | | |
|---|---|---|
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,284,688 A | 8/1981 | Stilcheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,923,574 A | 5/1990 | Cohen |
| 4,975,337 A | 12/1990 | Hyner et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 6,036,832 A | 3/2000 | Knol et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |

(56) References Cited

U.S. PATENT DOCUMENTS

| | | |
|---|---|---|
| 6,312,579 B1 | 11/2001 | Bank et al. |
| 6,344,123 B1 | 2/2002 | Bhatnagar |
| 6,355,153 B1 | 3/2002 | Uzoh et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 | 10/2002 | Donovan, III et al. |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,739,028 B2 | 5/2004 | Sievenpiper et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,979,490 B2 | 12/2005 | Steffier |
| 7,299,203 B1 | 11/2007 | Nelson |
| 7,581,933 B2 | 9/2009 | Bruce et al. |
| 7,736,753 B2 | 6/2010 | Deligianni et al. |
| 8,152,985 B2 | 4/2012 | Macary |
| 8,253,035 B2 | 8/2012 | Matsumoto |
| 8,585,875 B2 | 11/2013 | Cummings et al. |
| 8,814,437 B2 | 8/2014 | Braun |
| 9,005,420 B2 | 4/2015 | Tomantschger et al. |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,938,629 B2 | 4/2018 | Whitaker et al. |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 2001/0037944 A1 | 11/2001 | Sanada et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo et al. |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0205425 A1 | 9/2005 | Palumbo et al. |
| 2005/0279640 A1 | 12/2005 | Shimoyama et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2009/0004465 A1 | 1/2009 | Kano et al. |
| 2009/0101511 A1 | 4/2009 | Lochtman et al. |
| 2009/0130425 A1 | 5/2009 | Whitaker |
| 2009/0155617 A1 | 6/2009 | Kim et al. |
| 2009/0159451 A1 | 6/2009 | Tomantschger et al. |
| 2009/0283410 A1 | 11/2009 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1* | 10/2011 | Tomantschger ......... C25D 1/00 428/172 |
| 2011/0277313 A1 | 11/2011 | Soracco et al. |
| 2012/0088118 A1 | 4/2012 | Lomasney |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0231266 A1 | 8/2014 | Sherrer et al. |
| 2015/0315716 A1 | 11/2015 | Whitaker |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0024663 A1 | 1/2016 | Lomasney |
| 2016/0145850 A1* | 5/2016 | Cook ...................... B29B 11/14 52/309.14 |
| 2016/0159488 A1* | 6/2016 | Roach ................... B29D 22/00 416/245 R |
| 2016/0160863 A1* | 6/2016 | Roach ...................... F01D 5/26 415/119 |
| 2017/0191179 A1 | 7/2017 | Sklar |
| 2018/0016692 A1 | 1/2018 | Caldwell et al. |
| 2018/0016694 A1 | 1/2018 | Bao |
| 2018/0066375 A1 | 3/2018 | Morgan et al. |
| 2018/0071980 A1 | 3/2018 | Lomasney et al. |
| 2018/0245229 A1 | 8/2018 | Whitaker et al. |
| 2019/0309430 A1 | 10/2019 | Sklar |
| 2019/0360116 A1 | 11/2019 | Collinson et al. |

FOREIGN PATENT DOCUMENTS

| | | |
|---|---|---|
| CN | 101113527 A | 1/2008 |
| CN | 101195924 A | 6/2008 |
| CN | 102148339 A | 8/2011 |
| DE | 39 02 057 A1 | 7/1990 |
| DE | 10 2004 006 441 A1 | 12/2005 |
| DE | 10 2010 011 087 A1 | 9/2011 |
| EP | 1 498 976 A3 | 10/2006 |
| EP | 2 078 607 A1 | 7/2009 |
| EP | 3 128 045 A1 | 2/2017 |
| GB | 2 324 813 A | 11/1998 |
| JP | S47-2005 A | 2/1972 |
| JP | S52-109439 A | 9/1977 |
| JP | S58-197292 A | 11/1983 |
| JP | S60-97774 A | 5/1985 |
| JP | S61-99692 A | 5/1986 |
| JP | H01-132793 A | 5/1989 |
| JP | H05-251849 A | 9/1993 |
| JP | H06-196324 A | 7/1994 |
| JP | 07-065347 A | 3/1995 |
| JP | 2000-239888 A | 9/2000 |
| JP | 2001-181893 A | 7/2001 |
| JP | 2006-035176 A | 2/2006 |
| JP | 2009-215590 A | 9/2009 |
| KR | 10-2015-0132043 A | 11/2015 |
| SU | 36121 A1 | 4/1934 |
| WO | 83/02784 A1 | 8/1983 |
| WO | 95/14116 A1 | 5/1995 |
| WO | 97/00980 A1 | 1/1997 |

(56) References Cited

FOREIGN PATENT DOCUMENTS

| WO | 02/33150 A2 | 4/2002 |
|---|---|---|
| WO | 03/100484 A2 | 12/2003 |
| WO | 2004/001100 A1 | 12/2003 |
| WO | 2007/045466 A1 | 4/2007 |
| WO | 2007/136387 A1 | 11/2007 |
| WO | 2007/138619 A1 | 12/2007 |
| WO | 2009/045433 A1 | 4/2009 |
| WO | 2011/033775 A1 | 3/2011 |
| WO | 2012/012789 A1 | 1/2012 |
| WO | 2012/145750 A2 | 10/2012 |
| WO | 2013/133762 A1 | 9/2013 |

OTHER PUBLICATIONS

Onoda et al., "Preparation of amorphous/crystalloid soft magnetic multilayer Ni—Co—B alloy films by electrodeposition," *Journal of Magnetism and Magnetic Materials*, 126, pp. 595-598, 1993.

Saleh et al., "Effects of electroplating on the mechanical properties of stereolithography and laser sintered parts," *Rapid Prototyping Journal*, vol. 10, No. 5, pp. 305-315, 2004.

Shishkovski, "Laser synthesis of functionally graded meso structures and bulk products," Moscow, FIZMATLIT, pp. 30-38, 43-47, 2009.

Leith et al., "Characterization of Flow-Induced Compositional Structure in Electrodeposited NiFe Composition-Modulated Alloys" *J. Electrochem. Soc.* 145(8): 2827-2833, 1998.

"Appendix 1: Literature review (Task 1): Literature review concerning the improvement of galvanneal (Ga) coating adherence during shear test of adhesively bonded Ga steel sheets," 70 pp., no. date.

"Low-temperature iron plating," web blog article found at http:blog.sina.com.cn/s/blog_48ed0a9c01100024z.html, published Mar. 22, 2006, 3 pages. (with English translation).

Adams et al., "Controlling strength and toughness of multilayer films: A new multiscalar approach," *J Appl. Phys.* 74(2):1015-1021, 1993.

Aizenberg et al., "Skeleton of *Euplectella* sp.: Structural Hierarchy from the Nanoscale to the Macroscale," *Science* 309:275-278, 2005.

Alfantazi et al., "Synthesis of nanocrystalline Zn-Ni alloy coatings," *JMSLD5* 15 (15):1361-1363, 1996.

Atanassov et al., "Electrodeposition and properties of nickel-manganese layers," *Surface and Coatings Technology* 78:144-149, 1996.

Bakonyi et al., "Electrodeposited multilayer films with giant magnetoresistance (GMR): Progress and problems," *Progress in Materials Science* 55:107-245, 2010.

Bartlett et al., "Electrochemical deposition of macroporous platinum, palladium and cobalt films using polystyrene latex sphere templates," *Chem. Communl* ., pp. 1671-1672, 2000.

Beattie et al., "Comparison of Electrodeposited Copper-Zinc Alloys Prepared Individually and Combinatorially," *J Electrochem. Soc.* 150(11):C802-C806, 2003.

Bird et al., "Giant Magnetoresistance in Electrodeposited Ni/Cu and Co/Cu Multilayers," *J Electrochem. Soc.* 142(4):L65-L66, 1995.

Blum, "The Structure and Properties of Alternately Electrodeposited Metals," presented at the Fortieth General Meeting of the American Electrochemical Society, Lake Placid, New York, Oct. 1, 1921, 14 pages.

Cohen et al., "Electroplating of Cyclic Multilayered Alloy (CMA) Coatings," *J Electrochem. Soc.* 130(10):1987-1995, 1983.

Cowles, "High cycle fatigue in aircraft gas turbines—an industry perspective," *International Journal of Fracture* 80(2-3):147-163, 1996. (5 pages).

"Designing with Metals: Dissimilar Metals and The Galvanic Series," printed Oct. 5, 2017, 3 pages.

Despic et al., "Electrochemical Formation of Laminar Deposits of Controlled Structure and Composition," *J Electrochem. Soc.* 136(6):1651-1657, 1989.

Dini et al. "On the High Temperature Ductility Properties of Electrodeposited Sulfamate Nickel," *Plating and Surface Finishing* 65(2):36-40, 1978.

Etminanfar et al., "Corrosion resistance of multilayer coatings of nanolayered Cr/Ni electrodeposited from Cr(III)-Ni(II) bath," *Thin Solid Films* 520:5322-5327, 2012.

Gasser et al., "Materials Design for Acoustic Liners: an Example of Tailored Multifunctional Materials," *Advanced Engineering Materials* 6(1-2):97-102, 2004.

Georgescu et al., "Magnetic Behavior of [Ni/Co-Ni-Mg-N] x n Cylindrical Multilayers prepared by Magnetoelectrolysis," *Phys. Stat. Sol.* (a) 189(3):1051-1055, 2002.

Ghanem et al., "A double templated electrodeposition method for the fabrication of arrays of metal nanodots," *Electrochemistry Communications* 6:447-453, 2004.

"Gold," web page, version: modified Nov. 3, 2008, retrieved from: <URL:http://en.wikipedia.org/wiki/Gold>.

Grimmett et al., "Pulsed Electrodeposition of Iron-Nickel Alloys," *J Electrochem. Soc.* 137(11):3414-3418, 1990.

Hariyanti, "Electroplating of Cu-Sn Alloys and Compositionally Modulated Multilayers of Cu-Sn-Zn-Ni Alloys on Mild Steel Substrate," Master of Science Thesis, University of Science, Malaysia, Penang, Malaysia, 2007. (81 pages).

Huang et al., "Hardness variation and annealing behavior of a Cr-Ni multilayer electroplated in a trivalent chromium-based bath," *Surface and Coatings Technology* 203:3320-3324, 2009.

Huang et al., "Characterization of Cr-Ni multilayers electroplated from a chromium(III)-nickel(II) bath using pulse current," *Scripta Materialia*, 57:61-64, 2007.

Igawa et al., "Fabrication of SiC fiber reinforced SiC composite by chemical vapor infiltration for excellent mechanical properties," *Journal of Physics and Chemistry of Solids* 66:551-554, 2005.

Ivanov et al., "Corrosion resistance of compositionally modulated multilayered Zn-Ni alloys deposited from a single bath," *Journal of Applied Electrochemistry* 33:239-244, 2003.

Jeong et al., "The Effect of Grain Size on the Wear Properties of Electrodeposited Nanocrystalline Nickel Coatings," *Scripta Mater.* 44:493-499, 2001.

Jia et al., "LIGA and Micromolding" Chapter 4, *The MEMS Handbook*, 2nd edition, CRC Press, Boca Raton, Florida, Edited by Mohamed Gad-el-Hak, 2006.

Kalu et al., "Cyclic voltammetric studies of the effects of time and temperature on the capacitance of electrochemically deposited nickel hydroxide," *Journal of Power Sources* 92:163-167, 2001.

Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.

Karimpoor et al., "Tensile Properties of Bulk Nanocrystalline Hexagonal Cobalt Electrodeposits", *Materials Science Forum* 386-388:415-420, 2002.

Keckes et al., "Cell-wall recovery after irreversible deformation of wood," *Nature Materials* 2:810-814, 2003.

Kirilova et al., "Corrosion behaviour of Zn-Co compositionally modulated multilayers electrodeposited from single and dual baths," *Journal o fApplied Electrochemistry* 29:1133-1137, 1999.

Kockar et al., "Effect of potantiostatic waveforms on properties of electrodeposited NiFe alloy films," *Eur. Phys. J. B*(42):497-501, 2004.

Lashmore et al., "Electrodeposited Cu-Ni Textured Superlattices," *J. Electrochem. Soc.* 135(5):1218-1221, 1988.

Lashmore et al., "Electrodeposited Multilayer Metallic Coatings", *Encyclopedia of Materials Science and Engineering*, Supp. vol. 1, 136-140, 1988.

Leisner et al., "Methods for electrodepositing composition-modulated alloys," *Journal of Materials Processing Technology* 58:39-44, 1996.

Lekka et al., "Corrosion and wear resistant electrodeposited composite coatings," *Electrochimica Acta* 50:4551-4556, 2005.

Lewis et al., "Stability in thin film multilayers and microlaminates: the role of free energy, structure, and orientation at interfaces and grain boundaries," *Scripta Materialia* 48:1079-1085, 2003.

(56) References Cited

OTHER PUBLICATIONS

Low et al., "Electrodeposition of composite coatings containing nanoparticles in a metal deposit," *Surface & Coating Technology* 201:371-383, 2006.
Malone, "New Developments in Electroformed Nickel-Based Structural Alloys," *Plating and Surface Finishing* 74(1):50-56, 1987.
Marchese, "Stress Reduction of Electrodeposited Nickel," *Journal of the Electrochemical Society* 99(2):39-43, 1952.
Material Safety Data Sheet, CFOAM Carbon Foams, Touchstone Research Laboratory, Ltd., 4 pages, 2008.
Meng et al., "Fractography, elastic modulus, and oxidation resistance of Novel metal-intermetallic Ni/Ni$_3$Al multilayer films," *J. Mater. Res.* 17(4):790-796, 2002.
Naslain et al., "Synthesis of highly tailored ceramic matrix composites by pressure-pulsed CVI," *Solid State Ionics* 141-142:541-548, 2001.
Naslain, "The design of the fibre-matrix interfacial zone in ceramic matrix composites," *Composites Part A* 29A, pp. 1145-1155, 1998.
Nicholls, "Advances in Coating Design for High-Performance Gas Turbines," *MRS Bulletin*, pg. 659-670, 2003.
Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990. (5 pp.).
Pilone et al., "Model of Multiple Metal Electrodeposition in Porous Electrodes," *Journal of the Electrochemical Society* 153(5):D85-D90, 2006.
Podlaha et al. "Induced Codeposition : 1. An Experimental Investigation of Ni-Mo Alloys," *J. Electrochem. Soc.* 143(3):885-892, 1996.
Ross, "Electrodeposited Multilayer Thin Films," *Annual Review of Materials Science* 24:159-188, 1994.
Rousseau et al., "Single-bath Electrodeposition of Chromium-Nickel Compositionally Modulated Multilayers (CMM) From a Trivalent Chromium Bath," *Plating and Surface Finishing*, pp. 106-110, 1999.
Sanders et al., "Mechanics of hollow sphere foams," *Materials Science and Engineering* A347:70-85, 2003.
Sartwell et al., "Replacement of Chromium Electroplating on Gas Turbine Engine Components Using Thermal Spray Coatings," Naval Research Laboratory, 2005. (207 pages).
Schwartz, "Multiple-Layer Alloy Plating", ASM Handbook, vol. 5: Surface Engineering, pp. 274-276, 1994.
Sherik, "Synthesis, Structure and Properties of Electrodeposited Bulk Nanocrystalline Nickel", Master's Thesis, 176 pp. 1993.
"Silver," web page, version: modified Nov. 3, 2008, retrieved from: <URL:http://en.wikipedia.org/wiki/Silver>.
Simunovich et al., "Electrochemically Layered Copper-Nickel Nanocomposites with Enhanced Hardness," *J. Electrochem. Soc.* 141(1):L10-L11, 1994.
Sperling et al., "Correlation of stress state and nanohardness via heat treatment of nickel-aluminide multilayer thin films," *J. Mater. Res.* 19(11):3374-3381, 2004.
Srivastava et al., "Corrosion resistance and microstructure of electrodeposited nickel-cobalt alloy coatings," *Surface & Coatings Technology* 201:3051-3060, 2006.
Stephenson, Jr., "Development and Utilization of a High Strength Alloy for Electroforming," *Plating* 53(2): 183-192, 1966. (11 pages).
Suresh, "Graded Materials for Resistance to Contact Deformation and Damage," *Science* 292:2447-2451, 2001.
Switzer et al., "Electrodeposited Ceramic Superlattices," *Science* 247:444-446, 1990.
Tench et al., "Considerations in Electrodeposition of Compositionally Modulated Alloys," *J. Electrochem. Soc.* 137(10):3061-3066, 1990.
Tench et al "Enhanced Tensile , Strength for Electrodeposited Nickel-Copper Multilayer Composites," *Metallurgical Transactions A* (15A):2039-2040, 1984.
Thangaraj et al., "Corrosion behaviour of composition modulated multilayer Zn-Co electrodeposits produced using a single-bath technique," *Journal of Applied Electrochemistry* 39:339-345, 2009.
Thangaraj et al., "Surface Modification by Compositionally Modulated Multilayered Zn-Fe Coatings," *Chinese Journal of Chemistry* 26:2285-2291, 2008.
Tokarz et al., "Preparation, structural and mechanical properties of electrodeposited Co/Cu multilayers," *Physica Status Solidi* 11:3526-3529, 2008.
Vill et al., "Mechanical Properties of Tough Multiscalar Microlaminates," *Acta metal. mater.* 43(2):427-437, 1995.
Voevodin et al., "Superhard, functionally gradient, nanolayered and nanocomposite diamond-like carbon coatings for wear protection," *Diamond and Related Materials* 7:463-467, 1998.
Wearmouth et al., "Electroforming with Heat-Resistant, Sulfur-Hardened Nickel," *Plating and Surface Finishing* 66(10):53-57, 1979.
Weil et al., "Pulsed Electrodeposition of Layered Brass Structures," *Metallurgical and Materials Transactions* 19(6):1569-1573, 1988.
Weil et al., "Properties of Composite Electrodeposits," Final Report, Contract No. DAAL03-87-K-0047, U.S. Army Research Office, 21 pages, 1990.
Wilcox, "Surface Modification With Compositionally Modulated Multilayer Coatings," *The Journal of Corrosion Science and Engineering*, 6, Paper 52, 5 pages (submitted Jul. 6, 2003; fully published Jul. 26, 2004).
Wu et al., "Preparation and characterization of superhard CNV/ZrN multilayers," *J. Vac. Sci. Technol. A* 15(3):946-950, 1997.
Yahalom et al., "Formation of composition-modulated alloys by electrodeposition," *Journal of Materials Science* 22:499-503, 1987.
Yang et al., "Effects of SiC sub-layer on mechanical properties of Tyranno-Sa/SiC composites with multiple interlayers," *Ceramics International* 31:525-531, 2005.
Yang et al., "Enhanced elastic modulus in composition-modulated gold-nickel and copper-palladium foils," *Journal of Applied Physics* 48(3):876-879, 1977.
Yogesha et al., "Optimization of deposition conditions for development of high corrosion resistant Zn-Fe multilayer coatings," *Journal of Materials Processing Technology* 211:1409-1415, 2011.
Zabludovsky et al., "The Obtaining of Cobalt Multilayers by Programme-Controlled Pulse Current," Transactions of the Institute of Metal Finishing, Maney Publishing, Birmingham, GB, 75(5):203-204, 1997. (3 pages).
U.S. Appl. No. 16/346,843, dated May 1, 2019.
U.S. Appl. No. 16/496,925, dated Sep. 23, 2019.
U.S. Appl. No. 16/582,931, dated Sep. 25, 2019.
U.S. Appl. No. 16/606,723, dated Oct. 18, 2019.
U.S. Appl. No. 16/671,104, dated Oct. 31, 2019.
U.S. Appl. No. 16/726,079, dated Dec. 23, 2019.

\* cited by examiner

METHODS OF PREPARING ARTICLES BY ELECTRODEPOSITION AND ADDITIVE MANUFACTURING PROCESSES

EXPRESS INCORPORATION BY REFERENCE

This application is a continuation of International Application No. PCT/US2015/050920, filed Sept. 18, 2015, which claims the benefit of U.S. Provisional Patent Application No. 62/052,428, filed Sept. 18, 2014, which application is incorporated herein by reference in its entirety. In addition, the disclosures of U.S. Provisional Patent Application No. 61/798,559, filed Mar. 15, 2013, and International Application PCT/US2014/030592, filed Mar. 17, 2014, are expressly incorporated herein by reference in their entireties.

FIELD

Included within this disclosure are articles comprising nanolaminate metal coatings and methods of making them.

SUMMARY

Embodiments of the present disclosure provide methods for the production of articles by additive manufacturing coupled with electrodeposition. Such methods comprise at least two steps. The first involves forming at least one preform for the article by additive manufacturing such as three-dimensional (3D) printing. The preforms for the article are then subjected to electrodeposition processes that provide a coating that possesses desirable chemical, physical, and/or mechanical properties.

In order to promote coating uniformity, which affects coating performance, the present disclosure includes, among other things, embodiments comprising the use of electroplating shields and thieves to control the electrodeposition process. The shields and thieves may be prepared by any appropriate means such as, e.g., machining, molding, or by additive manufacturing such as three-dimensional (3D) printing. In embodiments disclosed herein, the shields and thieves may be prepared in the same additive manufacturing process as the preform for the article or as separate items that are assembled via mating interfaces to form an electroplatable assembly. Alternatively, in other embodiments, the shields and/or thieves may be prepared along with the preform for the article by additive manufacturing processes. Where the shields and/or thieves are prepared along with the preform in a single additive manufacturing process, each may be oriented in three dimensional space relative to the others to produce the desired level of uniformity in the electrodeposited coating thickness.

In addition to the use of shields and/or thieves, embodiments herein provide the use of mass transfer (e.g., electrolyte delivery to specific locations on the surface of the preform) to increase the uniformity of the coating formed by electrodeposition.

Embodiments of the methods described herein thus enable the production of articles that are not only lightweight relative to similar articles fabricated entirely out of a material such as metal, ceramic or a composite, but which also can be readily designed to meet specific requirements for a range of applications including, e.g., commercial and defense applications. Embodiments of the processes described herein may also be used on various scales and are suited for both low and high rate production. Embodiments of the present disclosure thus provide a method for the production of parts having chemical, physical and/or mechanical properties that permit their use in applications where metal, ceramic and/or composite parts have typically been used.

Constructal flow distributors could also be applied to planar substrates, e.g. wafers, where the interest may lie in controlling coating thickness, composition uniformity and/or distribution in 2D (e.g. over-patterns) and would, therefore, be a way of controlling both wafer-scale and pattern-scale uniformity.

Figure 1A:
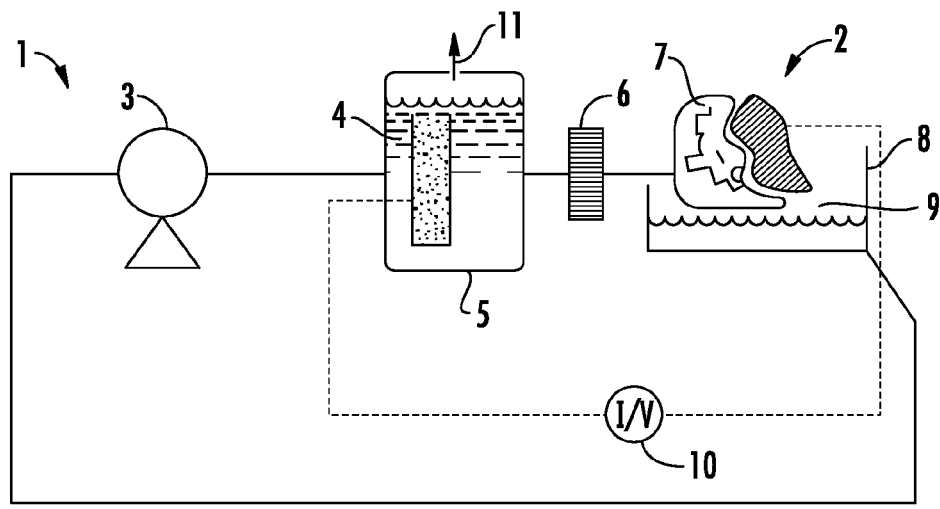
FIG. 1A shows a plating apparatus (1) that employs a flow through constructal flow distributor to conduct electroplating of a workpiece/preform (2). The apparatus has a pump (3) that recirculates electrolyte (4) first through a counter electrode chamber (5) then through a filter (6) and the constructal flow distributor (7). After impinging on the workpiece (2), electrolyte returns/falls into a holding reservoir (8), ensuring there is an air break (9) to guarantee no reverse/short circuiting of current provided by the power supply (10). The counter electrode chamber (5) contains a gas venting valve (11) to allow escape of evolved gases while maintaining system pressure. The filter (6), downstream of the counter electrode chamber, reduces the likelihood of clogs and/or particulate inclusion in the deposit.
Figure 1B:
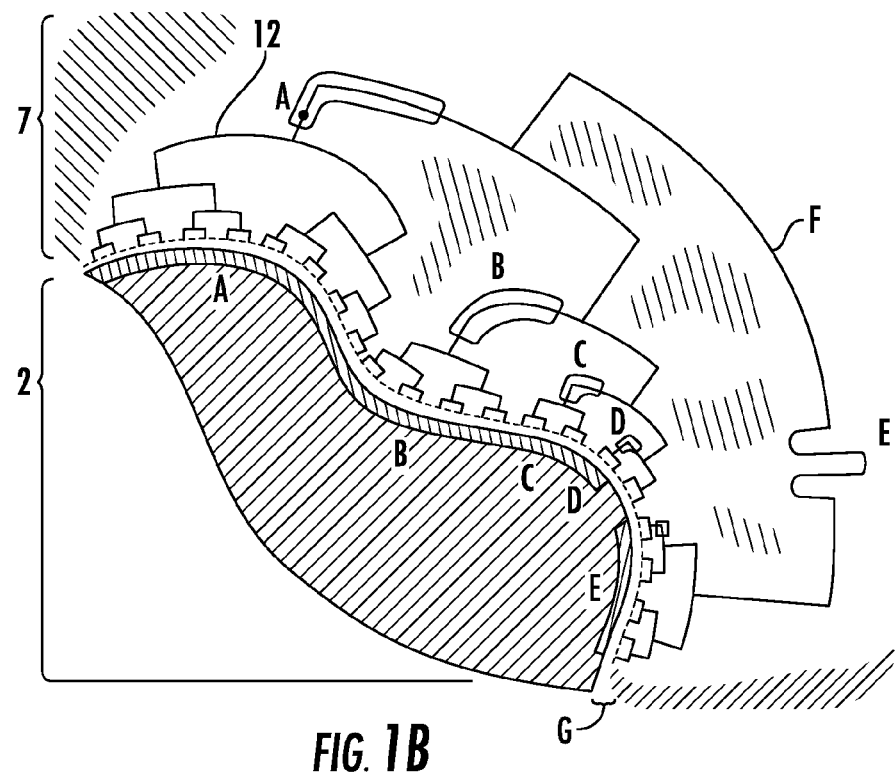
FIG. 1B shows a close up of the constructal flow distributor (7) and workpiece/preform (2) shown in FIG. 1A, which is rotated 180 degrees. The close up shows the network of channels (tubes) in the distributor 12. Elements (structures) A-G are described below.
- A. Network segment whose dimensions influence region "a" of the workpiece.
- B. Network segment whose dimensions influence region "b" of the workpiece.
- C. Network segment whose dimensions influence region "c" of the workpiece.
- D. Network segment whose dimensions influence region "d" of the workpiece.
- E. Illustration of network tailoring to promote balanced current and mass transfer distribution over region "e" of the workpiece.
- F. Source of current and flow (anode chamber and pump).
- G. Distributor—workpiece gap, or "fly-height."
Figure 2:
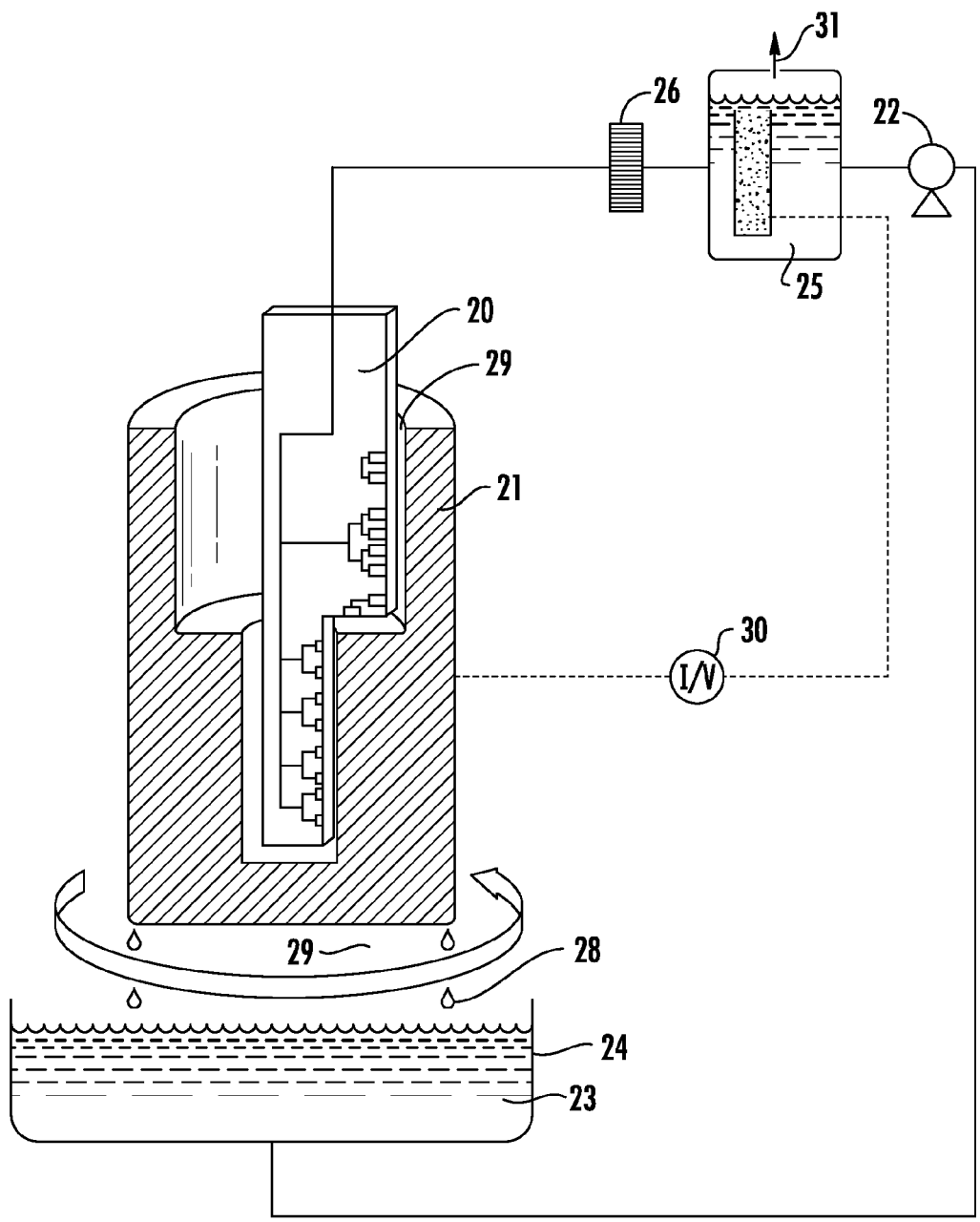

FIG. 2 shows a 2-dimensional constructal flow distributor (20) employed in the electrodeposition of a coating on a rotating axis-symmetric workpiece/preform (21), which is shown in a cutaway view. The apparatus shown has a pump (22) that recirculates electrolyte (23) from the electrolyte reservoir (24) first through counter electrode chamber (25), then through a filter (26), and subsequently to the constructal flow distributor (20). After impinging on the workpiece (21), electrolyte returns/falls (28) into the electrolyte reservoir (24), ensuring there is an air break (29) to guarantee no reverse/short circuiting of current provided by power supply (30). The counter electrode chamber (25) contains a gas venting valve (31) to allow escape of evolved gases while maintaining system pressure. A filter (26) downstream of the counter electrode chamber reduces the likelihood of clogs and/or particulate inclusion on the deposit.

DETAILED DESCRIPTION

1.0 Definitions

"Additive manufacturing" means the preparation of three-dimensional articles by the sequential addition of materials.

The process includes all forms of direct digital manufacturing, including but not limited to traditional three-dimensional printing (3D-printing), selective laser sintering (SLS) or sintering laser melting (SLM), fused deposition modeling (FDM), and stereolithography (SLA).

"Direct digital manufacturing," "rapid prototyped" or "rapid prototyping" means the additive manufacturing or 3D printing process of making a three-dimensional solid article of any shape from a digital model. The process is an additive one, where successive layers, ribbons, beads, or areas of material are laid down or solidified in different shapes to form a three dimensional article.

"Selective laser sintering" (SLS) refers to a process where a bed of powder is locally bonded by the action of a laser to form one cross-section of an article at a time.

"Fused deposition modeling" (FDM) refers to a process where molten material (e.g., thermoplastic) is used to sequentially build up an article of a desired shape.

"Stereolithography" (SLA) refers to a process where a liquid polymer is locally solidified by photo-initiated cross-linking. In the process, light is focused onto the surface of a container of uncured photopolymer, and the desired 2D cross-sectional shape is "drawn," producing a solidified 2D pattern. Repeating this process produces 3D geometries of the desired shape.

"Laminated object manufacturing" (LOM) means the use of thin layers cut to shape and joined together (e.g. paper, polymer, metal) to form a desired three-dimensional article.

"Electroless plating" means autocatalytic plating in which the plating bath contains reducing agents ready to react with the substrate, and the catalyst is the metal to be deposited or the metal on the surface of an article placed in the plating bath.

"Preform" means an object or article possessing a shape such that, after applying a given thickness of laminated material, yields a part with the desired shape and properties.

"Oriented with respect to" or "oriented relative to" means that the items are arranged in a specific manner in three dimensional space (i.e., the distance and rotation of each item "with respect to" or "relative to" the other items is specifically defined or fixed in three dimensional space relative to each other).

"Thief" as used herein means a conductive element (structure) that steals current density from regions of a workpiece (e.g., a preform for an article) that would otherwise be electroplated. Except where expressly intended to denote a plurality of thief elements, as used herein the term "thieves" means either one or a plurality of such thief elements.

"Shield" as used herein is an element (structure) that is typically non-conductive and impedes the passage of current to regions which would otherwise be electroplated. Where a shield is prepared from material that is conductive, it may be masked by non-conductive material (e.g., wax or rubber) to effectively render it non-conductive. Except where expressly intended to denote a plurality of shield elements, as used herein the term "shields" means either one or a plurality of such shield elements.

"Mating interfaces" means interfaces on a preform for an article, shields, thieves and/or framework sections that permit joining the preform for an article to one or more of shields, thieves and/or framework sections to form an electroplatable assembly where the preform is oriented with respect to any shields and/or thieves present, particularly in a manner matching the CAD-optimized shield and thief geometry to produce uniform current density on the surface of the preform when electroplated.

A "framework" or a "section of framework" is an element (structure) used to connect one or more of a preform for an article, a thief and/or a shield. The framework aids in fixing/holding those elements (structures) oriented relative to each other, for example in an electroplatable assembly. The framework may be produced separately, or along with one or more of the preform for an article and/or thieves or shields, particularly when those items are prepared by additive manufacturing. Alternatively, the framework or a section of framework may be prepared separately and may additionally have mating interfaces at locations where a preform, thief, shield or another section of framework is to be joined with it. A framework can be used to limit the need for shields and thieves to connect directly to the preform as points of contact may result in damage to, or imperfections in, the coating formed on the preform.

"Electroplatable assembly" means a preform for an article and one or more of shields and/or thieves joined, with or without a section of framework so that the preform is oriented with respect to at least one shield and/or at least one thief.

Where compositions or amounts are given as percentages herein, the composition is given on a weight basis unless stated otherwise.

2.0 Description 2.1 Overview

In embodiments of the processes described herein, coatings or claddings comprising one or more metals or alloys can be applied in a uniform or substantially uniform conformal manner to all or part of a preform, thereby imparting desirable chemical, physical, and mechanical (structural) properties to the preformed part with a minimal increase in mass, depending on the thickness of the coating, especially as compared to the same type of article made from solid metal or ceramic.

Most commercial electrodeposition electrolytes are designed to have plating rates and alloy compositions that are relatively insensitive to variations in current density. The preparation of nanolaminated materials, particularly from single electrolytes, however, relies in large part on electrolytes which, depending on current density, produce materials of differing structures and/or compositions. That sensitivity allows modulation of structure/composition as the nanolaminated material grows, leading to laminated material architectures and their corresponding performance attributes. Where laminated (e.g., nanolaminated) materials are electrodeposited, however, particularly from a single electrolyte displaying current-density sensitive electrodeposition, variations in current density on the surface of the object subject to electrodeposition results in concomitant variations in laminate thickness, the structure/composition within each layer, and the structure/composition differences between layers.

Accordingly, when producing materials having electrodeposited coatings where uniformity or substantial uniformity of coating thickness and/or composition across all or a portion is necessary or desirable, and particularly where the coatings comprise finely controlled layering schemes (e.g., nanolamination), it is advantageous to have a uniform or substantially uniform, or at least a more uniform, current distribution over the surface of the workpiece (e.g., preform), achieved through methods other than electrolyte engineering (e.g., reduced deposit sensitivity to current density).

Embodiments of methods and apparatuses are described herein for achieving a more uniform current distribution over the surface of the workpiece. Embodiments of the methods for rendering current distributions more uniform over workpieces described herein may employ the use of Computer Assisted Design-optimized (CAD-optimized) shield and thief geometries. The methods implement the design process by preparation of preforms for articles in conjunction with shields and/or thieves, including using the ability of additive manufacturing processes to prepare articles having complex shapes. The additive manufacturing process can prepare the preform and optionally the shields and/or thieves in a single electroplatable assembly that holds the preform, shields and thieves oriented relative to each other in a configuration matching CAD-optimized shield and thief geometries. Alternatively, the preform and shields and/or thieves can be prepared separately and assembled via mating interfaces that permit joining those elements into an electroplatable assembly in a configuration matching CAD-optimized shield and thief geometries.

Embodiments of the methods described herein employ mixing of the electrolyte and/or agitation of the workpiece/assembly (e.g., by an ultrasonic transducer) to ensure mixing of the electrolyte at the workpiece surface.

In some embodiments, the current density uniformity on the surface of a preform for an article, and accordingly the uniformity of the electrodeposited coating on a preform, is controlled using only shield geometry and orientation. In other embodiments, the method employs the shield geometry as the sole path for both current and electrolyte flow to control the current density uniformity on the surface of a preform, and accordingly the uniformity of the electrodeposited coating on a preform for an article.

Flowing electrolyte over the surface of a workpiece (e.g., preform for an article) can be used to accomplish transfer of the electrolyte to portions of the preform that have lower current density during electrodeposition of a coating than other areas of the preform, which can lead to unequal coating and/or composition. Such portions of the preform include, e.g., those in recesses or on the interior sections of a preform (e.g. the interior of a preform comprising a tubular structure). Flowing electrolyte may be accomplished by means of one or more tubes that are introduced into an electroplatable assembly such that electrolyte streaming from one or more openings in the tube(s) result in electrolyte flowing over one or more portions of the preform for an article, which may be submerged in electrolyte during this process. Alternatively, flowing electrolyte may be accomplished by pumping electrolyte through one or more passages within a framework (or section of framework) and/or a shield, where the passages have one or more openings at a surface of the framework or shield, such that electrolyte streaming from the openings results in the flowing of the electrolyte equally over one or more portions of the preform for the article.

Embodiments of the methods described above permit the formation of coatings having a high degree of uniformity even when applied to preforms with a complex geometry through the use of electroplating shields and thieves and mass transfer accomplished by mixing or flowing electrolyte. The shields and thieves may be prepared so they are oriented in a specific fashion with regard to each other, for example by additive manufacturing either simultaneously or in separate processes. Where the shields and/or thieves are prepared as separate objects from the preform for the article, they may each have mating interfaces that permit them to be joined to each other or to sections of framework that permit their assembly into an electroplatable assembly where they are oriented relative to each other. Such embodiments can enable production processes to go from raw material to end product in a single production line while producing an article with precise tolerances including coatings that have a limited variation in their thickness.

2.2 Methods of Preform, Shield and Thief Preparation and their Composition

The processes described herein may employ preforms for an article, shields and/or thieves prepared from a variety of materials, including metals, ceramics, and polymers (plastics). Their preparation may be accomplished by any additive manufacturing process including, but not limited to, direct digital deposition, three-dimensional printing (3D-printing), selective laser sintering (SLS) and/or selective laser melting (SLM), fused deposition modeling (FDM), and stereolithography.

When preforms, shields and/or thieves are to be prepared out of metal, ceramic, or glass, the additive manufacturing process employed will typically employ SLS and/or SLM processes. Such processes can prepare preforms from one or more metals including, but not limited to, steels, stainless steels, titanium, brass, bronze, aluminum, gold, silver, cobalt-chrome, lead, tungsten and alloys of tungsten. Those processes can also be used to prepare preforms out of ceramics such as "green sand" (e.g., a mixture having: from about 75 to about 85% of a sand (silica sand ($SiO_2$), chromite sand ($FeCr_2O$), zircon sand ($ZrSiO_4$), olivine, staurolite); from about 5 to about 11% bentonite; from about 2% to about 4% water; from 0 to about 1% anthracite and from about 3% to about 5% inert or undefined materials).

Where the preforms, shields and/or thieves are to be prepared from polymers (e.g., thermoplastics), processes that include SLS and/or SLM and FDM may be employed.

Preforms, shields and/or thieves of polymer and plastic materials that can be prepared by additive manufacturing processes can be broadly divided into two categories: conductive and non-conductive materials. Where those items are prepared from non-conductive plastics, at least the portion of the surface upon which electrodeposition will occur must be made conductive. This is typically accomplished by applying a layer of metal using electroless plating, although other methods that achieve the desired result may be employed. Where a plastic employed to make a preform or thief is already conductive, the use of electroless plating is optional, but it may be advantageously employed to increase their conductivity before joining them into an electroplatable assembly and/or subjecting them to electrodeposition of a composition comprising one or more chemical elements (e.g., one or more metals, metal alloys, or combinations of one or more metals and one or more non-metals).

Accordingly, embodiments of a preform for an article, shields and/or thieves may comprise a non-conductive material such as a polymer or plastic. Such embodiments include a polymer comprising, e.g., polyetherimide (e.g., Ultem™), polyetherketoneketone (PEKK), polyether ether ketone (PEEK, e.g., KetaSpire®), nylon (e.g., Nylon 618), polyvinyl alcohol (PVA), acrylonitrile butadiene styrene (ABS), polycarbonate (PC), polylactic acid (PLA), PC/ABS, a polymer and wood fiber (e.g., LAYWOO-D3™), polyphenylsulfone (PPSU), or a combination of one or more, two or more, or three or more of the foregoing. In other embodiments, the polymer is, e.g., a polyetherimide, PEKK, PEEK, nylon, ABS, PC, PLA, PC/ABS, PPSU, or a combination of one or more, two or more, or three or more of the foregoing. Yet other embodiments may employ a different polymer or plastic.

In other embodiments, the preform, shields and/or thieves comprise a conductive material. In such embodiments the conductive material may comprise one or more chemical elements selected from the group consisting of Ag, Al, Au, B, Be, C (e.g., graphite), Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn and Zr. In other embodiments, the conductive material used to form the preform may comprise an alloy including but not limited to, e.g., steels, stainless steels, brass, bronze, nickel-cobalt, nickel-chromium, nickel-iron, zinc-iron, cobalt-chrome, tin based pewters, and alloys of tungsten. In other embodiments, the conductive material comprises metal fibers (e.g., stainless steel fibers such as in ElectriPlast® EP-SS/66) or metal plated carbon fibers (e.g., nickel plated carbon fiber ElectriPlast® EP-CF/PBT) in polymers such as polybutylene terephthalate, polycarbonate, polypropylene, ABS, PC and acrylonitrile butadiene styrene blend (PC-ABS), or polyamide (e.g., polyamide 66).

In other embodiments, conductive preforms, shields and/or thieves may comprise a conductive or non-conductive polymer and one or more metals or non-metallic conductive materials added to the polymers (e.g., before or after curing) that render the composition conductive or more conductive. Examples of conductive, non-metallic materials that can be added to polymers to increase conductivity are carbon black, graphene, graphite, carbon nanotubes, carbon nanofibers, or graphite fibers, which can be added to the polymers alone or in combination with conductive metallic materials.

A variety of conductive polymeric materials can be used to prepare preforms, shields and/or thieves that are conductive, including but not limited to polymers comprising graphene, graphite, polyaniline or polypyrrole.

2.3 Preform, Shield and Thief Structure

As noted above, preforms, shields and/or thieves may be prepared by any suitable process that can be used to make the desired shape from the desired material(s), including, e.g., machining, molding, casting, and additive manufacturing. In embodiments, preforms, shields and/or thieves are prepared by additive manufacturing, which also facilitates the fabrication of complex shapes and geometries. In some embodiments, those elements (structures) may comprise at least one section that includes a "honeycomb" network, e.g., of hexagonal prisms, pentagonal prisms, cubes, pyramidal prisms or triangular prisms (e.g., a sheet comprising a honeycomb of hollow hexagonal prisms). In other embodiments, all or a portion of a preform, shield and/or thief may be foam-like with pores that are discrete and/or fairly continuous throughout the foam-like portion.

In other embodiments, at least a portion of a preform, shield and/or thief comprises prisms that comprise a series of struts that extend in an essentially linear fashion between the vertices of polyhedral structures that are substantially tetrahedral, icosahedral, dodecahedral, octahedral or cubic that make up part of the preform. The struts may be substantially cylindrical (i.e., substantially circular) in a plane perpendicular to the two vertices the struts connect. The struts may also be substantially triangular, square, pentagonal, hexagonal, heptagonal, or octagonal in a plane perpendicular to the two vertices the struts connect. Such struts may have width in a plane perpendicular to that of the vertices the struts connect from about 0.2 to about 1.0 mm, from about 1 mm to about 1 cm, from about 5 mm to about 2 cm or from about 1 cm to about 5 cm. Other sizes may be employed depending on the size and shape of the structure.

In embodiments, the shield confines all current and electrolyte flow to a network of passages therein. In such embodiments, the shield functions as a flow-through distributor of both current and flow, and effects uniformity or substantial uniformity in both mass transfer and current distribution over specified regions of the workpiece. This flow-through distributor comprises one element (structure) of a flow cell, and is interposed in the flow path between anode/counter-electrode and workpiece. The effect of the flow-through distributor is to render the resistance (ohmic and pressure drop) uniform or substantially uniform from one or more points on the upstream side to one or more points on the distributor's downstream side, the latter of which is approximately conformal with—but separated from—the workpiece surface to be plated. Embodiments of a flow-through distributor can include, e.g., a porous solid which envelopes the region of the workpiece to be plated, and whose wall thickness and/or pore size are of sufficient dimensions to render the ohmic drop through the distributor a) dominant over all other ohmic drops between cathode and anode, and b) equal or substantially equal over the entire surface or a portion of the entire surface of the workpiece. Other embodiments, that would also help reduce the potential and pressure drop from counter-electrode/anode to the workpiece, can employ a constructal, branching network to deliver current and flow uniformly or substantially uniformly over at least a portion of the workpiece surface to be plated. Such a 'constructal distributor' typically would be amenable to additive manufacturing, especially when dealing with complex/highly nonplanar workpieces, although other manufacturing processes also could be used.

In some embodiments it may be desirable to introduce parts into preforms that assist in manufacturing but that are not intended to be included in the final article to be prepared. Accordingly, where it is necessary or desirable to introduce parts necessary or desirable for manufacturing, but not required in the final article, such as shields, thieves, sections of framework, tabs or wires for racking and electroplating, they can be located in non-structural portions of the article.

Additionally, the preform geometry can be defined such that, after electrodeposition of a nanolaminate, the resulting part is of the desired end-geometry but minimizes sharp corners, convex or concave sections that might be likely to result in highly non-uniform current distributions.

In addition to their structure, the preforms, shields, and thieves may have a surface roughness (usually expressed as an "Ra" value) as well as micropores. The presence of surface roughness and micropores may be advantageous for binding between the electrodeposited composition(s) (e.g., a nanolaminate coating) and the preform. Particularly where the preforms are comprised of a polymer, pores and surface roughness may be introduced into the polymer surface prior to the deposition of any metal-containing composition by either an electroless process or by electrodeposition. Additionally, the preforms can possess designed gradations in porosity, such as encountered in cancellous bone, wherein the pore size is large near the center of the preform and progressively decreases towards the preform's surface. Additive manufacturing is uniquely suited to fabricating such structures.

The presence of micropores and the surface roughness of materials may be changed by a variety of techniques, including chemical and or physical processes. In some embodiments, for example, preforms, shields and/or thieves may be subjected to chemical etching (e.g., exposure to chromic acid) to modify the surface prior to the deposition of any metal-containing composition on the preform, shield and/or thief.

FDM deposited polymers may be prepared with a higher porosity and/or surface area than the same material prepared by injection molding, leading to high bond strengths between the coating and the preform. The higher porosity and/or surface area inherent in the structure of FDM processed polymers results from their manufacture. Structures prepared by FDM process have an ordered structure of polymeric beads or threads, which are formed in that manner by the FDM machine. These beads result in small voids which, although enhancing the surface area and permitting higher binding between the preform and the coatings applied to the preform, can also entrap fluids and contaminants from chemical processes (e.g., electroless plating). The use of ultrasonic agitation can provide a method of removing chemicals and fluids from the structure of the FDM part. Traditional rinsing and agitation during electroless metallization processes may fail to adequately remove all chemicals and fluids from the structure of FDM parts.

Where preforms are comprised of metals, they may be subjected to machining to change the surface texture and remove markings from the additive manufacturing process. The surface finish may also be altered by electropolishing prior to electrodeposition of the final coating.

3.0 Electrodeposited Compositions and Nanolaminate Coatings and Process for their Application 3.1 the Use of Electroless Plating to Render Preforms and Thieves Suitably Conductive and Preparation of Preforms, Shields and Thieves for Electroplating.

In order to electrodeposit a composition comprising one or more chemical elements (e.g., one or more metals) on at least a portion of a surface of a preform or thief that is accessible to liquids, the surface must be conductive and brought in contact with a bath containing salts of the metals to be electrodeposited. To make the surfaces of non-conductive preforms conductive typically requires subjecting the surface to electroless plating of a metal such as nickel, cadmium, gold, silver, rhodium, chrome, zinc, tin, or copper. In embodiments, the metal applied to the preform by electroless deposition is nickel.

Preparation of thieves and preforms for electroless plating, particularly of non-conductive plastic/polymer preforms, generally includes a step of etching their surfaces. Etching is typically accomplished by using a strong oxidizing agent to create microscopic pores or holes in the surface of the plastic. The pores or holes increase the surface area and improve adhesion of subsequently applied metal layers. Some strong oxidizing solutions/suspensions used as etchants include peroxides (e.g., hydrogen peroxide), persulfates, chromic acid, acidic or basic permanganate solutions, chromium trioxide solutions or suspensions, and sulfuric acid. In embodiments, the thief and/or preform comprises ABS and the etchant is chromic acid or chromium trioxide containing solution/suspension.

Following etching, at least a portion of the etched section may be contacted with a composition that deposits a metallic catalyst on the etched surface of the polymer preform. The catalyst is typically palladium, which can be applied using tin as a reducing agent (e.g., $Sn^{+2}+Pd^{+2}=Sn^{+4}Pd^0$, however, other catalysts including noble metal catalysts may be used (e.g., platinum, rhodium, iridium, nickel, copper, silver, gold). Upon contact with the electroless plating bath, the catalyst causes a layer of metal to form on the surface of the polymeric thief or preform exposed to the catalyst and then the bath.

While thieves and/or preforms may comprise a solid mass of conductive or nonconductive material, they may also be comprised of a series of voids or pores. The voids or pores may be in fluid contact with the surface of the thief or preform and permit access to electrolytes used in electroless plating and other procedures such as rinsing. Liquids trapped in those voids, or chemical residues from those liquids may interfere with subsequent electrodeposition of coatings or become trapped in the finished part by subsequent electrodeposition.

Prior to electrodeposition of metal onto the surface of the preform, it is necessary to remove any of the residual electroless plating materials from the thieve(s) and preform so that they do not interfere with the plating or become trapped in the preform. Removal of the electroless bath components may be effected, e.g., by submersing the components in a bath or shower of cleaning solution (e.g., water) while exposing the preform to sonication. The sonication may employ sound energy at any frequency and amplitude that is effective. In some embodiments the frequency employed is from about 18-1000 kHz, e.g., 18-25 kHz, 25-50 kHz, 50-75 kHz, 75-100 kHz, 100-200 kHz, 200-300 kHz, 300-400 kHz, 400-500 kHz, 500-600 kHz, 600-700 kHz, 700-800 kHz, 800-900 kHz and 900-1000 kHz, and in other embodiments the frequency is about 20-23 kHz. In some embodiments, sonication is pulsed using a square or rectangular wave, resulting in frequency-rich excitations of the workpiece (preform)/electroplatable assembly. In some embodiments, the sonication is performed in a bath with a continuous flow of cleaning liquid into the bath.

In some embodiments, contacting an electroless plated thieve(s) and/or preform(s) with a bath or shower of liquid while being subjected to sonication removes greater than about 70%, 80%, 90%, 92%, 94%, 96%, 98% or 99% by weight of the electroless plating solution that remained associated with said electroless plated preform following its removal from the electroless plating solution.

In other embodiments, contacting an electroless plated thieve(s) and/or preform(s) with a bath or shower of liquid while being subjected to sonication removes greater than about 70%, 80%, 90%, 92%, 94%, 96%, 98% or 99% by weight of a component present in the electroless plating solution that remained associated with the electroless plated thieve(s) and/or preform(s) following their removal from the electroless plating solution.

Prior to electrodeposition of a composition comprising one or more chemical elements (e.g., a nanolaminate coating), it may be advantageous to remove liquids and or volatile components associated with the preforms, shield(s) and/or thieve(s). Removal of liquids or volatile components from preforms, including those from the electroless plating process or from bathing or showering the preform following electroless plating, may be accomplished, e.g., by subjecting the preform to a reduced pressure (vacuum). In embodiments, an electroless plated preform is subjected to a reduced gas pressure that is less than 760 mm of mercury (1 atmosphere). In other embodiments, the preforms are subject to a pressure that is less than 500, 400, 300, 200, 100, 50, 20, 10, 5, 2, 1, 0.5, 0.2, 0.1, 0.05, 0.02, or 0.01 mm of Hg. By exposing the preform to reduced gas pressure, greater than about 50%, 60%, 70%, 80%, 90%, 92%, 94%, 96%, 98% or 99% (by weight) of the liquids associated with said electroless plated preform can be removed.

Where preforms and/or thieves have been subjected to electroless plating and/or cleaning by exposure to a liquid, it may be desirable to place small holes (e.g. pinholes or orifices) in portions of the thieves and preforms so that electroless plating and/or cleaning solutions can be removed from the thieves and preforms. The small holes or apertures can be included in the preforms at non-structural, low stress, and/or visually discrete locations (e.g., out of the line of sight from the surface). Using holes formed in those locations permits the removal of both electroless plating compositions and liquids used during cleaning by ultrasonic cleaning and/or vacuum treatment described herein. The removal of those materials improves the quality of the subsequent electrodeposition processes (e.g., improving the adherence of the electrodeposited coating) and avoids the production of articles that are potentially contaminated or compromised by the presence of trapped liquids that may cause or contribute to deterioration of the article.

3.2 Electrodeposited Compositions and Nanolaminate Coatings

Metals, polymers, and semiconductors can all be electroplated (electrodeposited), and in most cases the required conditions are at or near ambient temperature and pressure. Embodiments of the processes described herein include methods of electrodepositing a composition comprising one or more chemical elements (e.g., one or more metals) on a preform prepared by additive manufacturing (and additionally on thieves if present), where the process can comprise one or more of the following steps:

subjecting all or part of the preform (and any thieves that may be present) to electroless plating;

providing a bath including at least one electrodepositable component (e.g., electroplatable metals);

joining the preform with at least one shield and/or thief prepared by additive manufacturing;

contacting all or part of the preform (as part of an electroplatable assembly comprising the preform and at least one shield and/or thief oriented with respect to each other) with the bath; and applying voltage or current to the preform to deposit at least one electrodepositable component comprising one or more chemical elements (e.g., one or more metals or a mixture of one or more metals and one or more non-metals).

In some embodiments, the bath comprises at least two, at least three, or at least four electrodepositable components. The electrodepositable components include metal salts, from which metals may be electroplated onto the preform and any thieves that are present, and where the bath comprises more than one metal salt as an electrodepositable component, alloys of varying composition may be electrodeposited on the preform and any thieves that may be present depending on the current and voltage applied. In some embodiments, the method of electrodepositing comprises applying a time varying current density, wherein the time varying current density oscillates at least for two cycles to deposit a structurally and/or compositionally modulated material on the preform. The structural and or compositionally modulated materials may be applied such that they have a discrete interface or a diffuse interface where the composition changes from a first composition to a second composition over a distance from about 3 nm to about 8 nm, about 5 nm to about 10 nm, about 7 nm to about 15 nm, or about 10 nm to about 20 nm. In other embodiments, a discrete interface between two layers may be considered as one in which the composition shifts between the compositions of the first layer and the second layer over a distance that is less than about 20%, about 15%, about 10%, about 8%, about 5%, about 4% or about 2% of the thickness of the thinner of the first and second layers. In other embodiments, layers have diffuse interfaces where the compositions vary from that of a first composition to a second composition in a continuous manner. In some embodiments, the diffuse interface varies between the compositions of the first and second layer over a distance that is greater than about 20%, about 25%, about 30%, about 35%, about 40%, about 45% and less than or equal to 50% of the thickness of the thinner of the first and second layers.

The composition comprising one or more chemical element that is electrodeposited onto the preform may vary in its constituent metals. In some embodiments, the composition comprises one or more, two or more, three or more, or four or more different elements independently selected from Ag, Al, Au, B, Be, C, Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn and Zr, wherein each of said independently selected metals is present at greater than 0.1, 0.05, 0.01, 0.005 or 0.001% by weight.

In other embodiments, the composition electrodeposited onto the preform comprises two or more, three or more, or four or more different elements independently selected from Ag, Al, Au, B, Be, C, Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn and Zr, wherein each of said independently selected elements is present at more than 0.1, 0.05, 0.01, 0.005, or 0.001% by weight. In such embodiments, compositions of two or more, three or more, or four or more different elements that can be electrodeposited comprise, for example, Zn and Fe, Zn and Ni, Co and Ni, Ni and Fe, Ni and Cr, Ni and Al, Cu and Zn, Cu and Sn, Ni, Co and P; Ni, Co, W and P; Ni, Co and W; Ni and W; Ni, W and P; Ni, Co and B; Ni, Co, W and B; or Ni, W and B.

In some embodiments, the composition electrodeposited onto the preform comprises a structurally and/or compositionally modulated electrodeposited material or composition. The structurally and/or compositionally modulated composition may comprise at least one portion having a plurality of layers deposited with wavelengths between about 1 nm and about 250 nm, about 1 nm and about 25 nm, about 5 nm and about 50 nm, about 10 nm and about 75 nm, about 1 nm and about 100 nm, about 2 nm and about 200 nm, about 5 nm and about 225 nm, or about 10 nm and about 250 nm.

In other embodiments, the structurally and/or compositionally modulated material has at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

As described above, where the electrodeposited material comprises two or more structurally and/or compositionally different layers, the layers may have a discrete or diffuse interface.

In embodiments where the electrodeposited material comprises two or more structurally and/or compositionally different layers, the composition may comprise a plurality of alternating first layers and second layers. The coating of electrodeposited material may consist entirely of the alternating first and second layers, which may have discrete or diffuse interfaces between the layers. Alternatively, one or more additional layers may be present in the coating between any first and second layer.

In embodiments where the electrodeposited composition applied to all or part of the preform comprises a plurality of layers (e.g., first layers and second layers or alternating first and second layers), the electrodeposited composition applied to the preform (e.g., as a conformal coating or partial coating) may comprise two or more, three or more, four or more, six or more, eight or more, ten or more, twenty or more, forty or more, fifty or more, 100 or more, 200 or more, 500 or more, 1,000 or more, 1,500 or more, or 2,000 or more alternating first and second layers independently selected for each multilayer coating.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises cobalt and/or chromium. In such embodiments, each second layer comprises chromium and/or cobalt in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises aluminum. In such embodiments, each second layer comprises aluminum in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises aluminum and/or cobalt. In such embodiments, each second layer comprises aluminum and/or cobalt in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises iron. In such embodiments, each second layer comprises iron in a range independently selected from 1%-35%, 1%-3%, 2%-5%, 5%-10%, 10%-15%, 15%-20%, 20%-25%, 25%-30%, or 30%-35%, the balance of which comprises nickel.

In some embodiments where a plurality of first and second layers are present, the first layers each comprise zinc in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises iron. In such embodiments, each second layer comprises iron in a range independently selected from 1%-35%, 1%-3%, 2%-5%, 5%-10%, 10%-15%, 15%-20%, 20%-25%, 25%-30%, or 30%-35%, the balance of which comprises zinc.

In some embodiments where a plurality of first and second layers are present, the first layers each comprise copper in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance of which comprises zinc and/or tin. In such embodiments, each second layer comprises zinc and/or tin in a range independently selected from 1%-35%, 1%-3%, 2%-5%, 5%-10%, 10%-15%, 15%-20%, 20%-25%, 25%-30%, or 30%-35%, the balance of which comprises copper.

In some embodiments where the components of the above-mentioned electrodeposited compositions are not completely defined (that is, less than 100% of the components by weight are defined and/or required), then the balance of those layers may comprise one or more different elements. That is particularly so in embodiments of the above-mentioned binary or ternary alloy compositions comprising a plurality of layers (e.g., of first and second layers). Thus, in some embodiments, the electrodeposited compositions may comprise one or more elements selected from the group consisting of Ag, Al, Au, B, Be, C, Cr, Cu, Fe, Hg, In, Ir, Mg, Mn, Mo, Nb, Nd, P, Pd, Pt, Re, Rh, Sb, Si, Sn, Pb, Ta, Ti, W, V, Zn and Zr. In other embodiments, where the electrodeposited composition comprises one or more of said first and/or second layers, the layers may each comprise one or more, two or more, three or more, or four or more elements selected independently for each first and second layer from the group consisting of Ag, Al, Au, B, Be, C, Cr, Cu, Fe, Hg, In, Mg, Mn, Mo, Nb, Nd, P, Pd, Pt, Re, Rh, Sb, Si, Sn, Pb, Ta, Ti, W, V, Zn and Zr.

In embodiments, the electrodeposited composition comprises a "fine-grained" or "ultrafine-grained" metal that comprises an electrodeposited metal or metal alloy having an average grain size from 1 nm to 5,000 nm (e.g., 1-20, 1-100, 5-50, 5-100, 5-200, 10-100, 10-200, 20-200, 20-250, 20-500, 50-250, 50-500, 100-500, 200-1,000, 500-2,000, or 1,000-5,000 nm based on the measurement of grain size in micrographs). In such embodiments the fine-grained metal or alloy may comprise one or more, two or more, three or more, or four or more elements selected independently from the group consisting of Ag, Al, Au, B, Be, C, Co, Cr, Cu, Fe, Hg, In, Mg, Mn, Mo, Nb, Nd, Ni, P, Pd, Pt, Re, Rh, Sb, Si, Sn, Pb, Ta, Ti, W, V, Zn and Zr. Fine-grained metals and alloys, including those comprising a high degree of twinning between metal grains, may remain ductile while having one or more properties including increased hardness, tensile strength, and corrosion resistance relative to an electrodeposited metal or alloy of the same composition with a grain size from 5,000 to 20,000 nm or greater.

In embodiments, the coefficient of thermal expansion of the nanolaminate coating layers and/or the fine grain coating layers is within 20% (less than 20%, 15%. 10%, 5%, or 2%)

of the workpiece in the direction parallel to workpiece movement (i.e., in the plane of the workpiece and parallel to the direction of workpiece movement).

In embodiments the electrodeposited composition comprises a metallic glass, (e.g., a composition comprising an amorphous metal and/or an amorphous metal alloy). In such embodiments the metallic glass may comprise one or more, two or more, three or more, or four or more elements selected independently from the group consisting of Ag, Al, Au, B, Be, C, Co, Cr, Cu, Fe, Hg, In, Mg, Mn, Mo, Nb, Nd, Ni, P, Pd, Pt, Re, Rh, Sb, Si, Sn, Pb, Ta, Ti, W, V, Zn and Zr.

4.0 Properties of Electrodeposited Coatings and Preformed Parts

Electrodeposited alloys applied to preforms (e.g., nanolaminate coatings) can be fully or substantially fully dense, having a limited number of pores or cracks, making them useful as corrosion resistant coatings, in addition to their role as a structural component of finished parts or articles.

In embodiments, the electroplated compositions are comprised of a plurality of layers less than about 100 nm. For example, the layers can be less than about 90 nm, less than about 80 nm, less than about 70 nm, less than about 60 nm, less than about 50 nm, less than about 40 nm, less than about 30 nm, less than about 20 nm. less than about 15 nm, or less than about 10 nm. Examples include layers of about 5-10 nm, 10-20 nm, 20-30 nm, 30-40 nm, 40-50 nm, 50-60 nm, 60-70 nm, 70-80 nm, 80-90 nm, and 90-100 nm, including layers of about 15 nm, 10 nm, 8 nm, or 5 nm. The compositions display increased "Hall-Petch" hardness/toughness and strength. The observed increase in hardness results from grain confinement and increased toughness results from force reflection in the laminate regions. Such coatings tend to follow the Hall-Petch relationship, which traditionally is used to describe the increase in yield strength observed in nanocrystalline materials.

In embodiments where the electroplated compositions are comprised of a plurality of layers of hard and soft materials laminated together, the electrodeposited composition may display Koehler toughening. That form of toughening results from a deflection of a nascent crack at the layer interface due to differing modulus. Such articles can thus absorb the energy that typically causes cracking and thereby prevent or substantially diminish bulk material failure, and/or prolong the time to such bulk material failure.

In addition to mechanical and physical enhancement of preform properties, compositions electrodeposited onto preforms also can alter the preforms' chemical attributes. In some embodiments, at least a portion of the composition electrodeposited onto a preform is chemically resistant to the environment and protects the underlying preform (e.g., the metal coating protects the preform from solvents or UV (ultraviolet) light that may damage the preform). In other embodiments, at least a portion of the composition electrodeposited on the preform is more noble than the underlying preform and acts as a barrier coating in corrosive environments that can damage the underlying preform. In yet other embodiments, at least a portion of the composition electrodeposited on the preform is less noble than the preform and sacrifices itself in corrosive environments to protect the preform.

The electrodeposited composition can have a Vickers microhardness as measured by ASTM E384-11e1 of 550-750, 550-600, 600-650, 650-700, 700-750, 750-800, 800-850, 850-900, 900-950, 950-1000, 1000-1100, 1100-1200, or higher without heat treatment. Heat treating the coatings at, for example 200° C. to 900° C. (e.g., 200° C.-300° C., 300° C.-400° C., 400° C.-500° C., 500° C.-600° C., 600° C.-700° C., 700° C.-800° C., or 800° C.-900° C.) in the presence of elements such as B, P, or C in the coatings can increase the hardness of the coating.

5.0 Variation

Coatings on preforms prepared in accordance with embodiments described herein using shields and/or thieves can exhibit reduced variations in thickness and/or composition as compared to coatings on preforms prepared under identical conditions without the shields and/or thieves. Variations can be measured in a number of ways. For example, variations in thickness can be measured within a single coating. In such cases, for example, the percent variation in thickness could be measured by sampling the coating thickness at multiple places using conventional measurement techniques, e.g., by ultrasonic thickness measurement or destructive sampling combined with microscopic measurement, and then applying the following formula to determine percent thickness variation (PTV):

$$PTV = [(\text{max. thickness} - \text{min. thickness})/\text{avg. thickness}] \times 100$$

Alternatively, PTV could be measured without sampling by using instruments such as X-ray tomography that can scan the entire coating and provide the PTV according to the above formula.

PTV variations calculated using the above formula for coatings prepared according to embodiments described herein can range from 100% or higher in some embodiments down to near zero in others, with lower values normally desired. For example, PTVs for coatings prepared in accordance with this disclosure can be less than: 5%, 10%, 15%, 20%, 25%, 30%, 40%, 50%, 60%, 70%, 80%, 90% or 100%. Ranges of PTVs for coatings prepared according to embodiments described herein thus can fall within any of the following: 0-5%, 5-10%, 10-15%, 15-20%, 20-25%, 25-30%, 30-40%, 40-50%, 50-60%, 60-70%, 70-80%, 80-90% and 90-100%.

Alternatively, or in addition to measuring the PTV, the percent variation in composition (PCV) also can be measured. For example, the percent variation could be measured by sampling the coating at multiple places and then measuring the concentration (in weight percent) of one or more chemical elements such as metals in the sample, e.g., by X-ray fluorescence (XRF). PCV then can be obtained by applying the formula:

$$PCV = [(\text{max. conc.} - \text{min. conc.})/\text{avg. conc.}] \times 100$$

Using the above formula, PCVs for one, two, three, four or more chemical elements in coatings prepared according to embodiments described herein can range from less than 100% and in some embodiments, near 0%. For example, PCVs for each of one, two, three, four or more chemical elements in coatings prepared in accordance with this disclosure can be independently selected from the ranges of less than: 5%, 10%, 15%, 20%, 25%, 30%, 40%, 50%, 60%, 70%, 80%, 90% or 100%. Ranges of PCVs for one, two, three, four or more elements in coatings prepared according to embodiments described herein thus can range from any of the following: 0-5%, 5-10%, 10-15%, 15-20%, 20-25%, 25-30%, 30-40%, 40-50%, 50-60%, 60-70%, 70-80%, 80-90% or 90-100%. Thus, for example, a coating could have a PCV for one element that is less than 5%, a PCV for a second element that is less than 20%, and a PCV for a third element that is less than 30%. As another example, a coating could have a PCV for one element that is in the range of 0-5%, a PCV for a second element that is in the range of 10-15%, and a PCV for a third element that is in the range of 25-30%, and a fourth element in the range of 50-60%.

Accordingly, embodiments of coatings prepared according to this disclosure can have PCVs for each of one, two, three, four or more chemical elements, and PTVs, that are both within ranges less than 100% and in some embodiments, near 0%. For example, the PCVs for one, two, three, four or more elements, and the PTVs, for embodiments of coatings prepared in accordance with this disclosure can both be less than: 5%, 10%, 15%, 20%, 25%, 30%, 40%, 50%, 60%, 70%, 80%, 90% or 100%. Alternatively, the PCV for each of one, two, three or four or more elements, and the PTV, for embodiments of coatings prepared in accordance with this disclosure could be independently selected from the group of less than: 5%, 10%, 15%, 20%, 25%, 30%, 40%, 50%, 60%, 70%, 80%, 90% and 100%. The PCVs for each of one, two, three, four or more elements, and PTVs, for coatings prepared according to embodiments described herein can independently be selected from any of the following ranges: 0-5%, 5-10%, 10-15%, 15-20%, 20-25%, 25-30%, 30-40%, 40-50%, 50-60%, 60-70%, 70-80%, 80-90% and 90-100%.

All combinations of PTVs and PCVs for coatings are thus contemplated. For example, both the PTV of a coating, and the PCV of one element of a coating, could be less than 10%. Or the PTV of a coating could be less than 10% and the PCV of one element of a coating could be less than 20%. That same coating could, e.g., have a PCV of a second element that is less than 30% and a PCV for a third element that is less than 40%.

6.0 Certain Embodiments

The preparation of articles using additive manufacturing to prepare a preform for the article and one or more of a thief or shield may be conducted in a variety of formats. One advantage of using additive manufacturing for the process is the ability to prepare objects having complex shapes, which permits the preparation of the preform for an article in an electroplatable assembly with any required shields and/or thieves present and precisely oriented in their desired positions. Alternatively, the preform and any thieves, shields, and sections of framework may be printed separately and joined to form an electroplatable assembly.

In embodiments, the preform for an article, any thieves, shields and framework may be prepared by additive manufacturing as a single object. All or part of the preform and thieves are treated with an electroless plating composition to render them conductive as required. The assembly is then subjected to electrodeposition of a coating, after which the article is separated from any thieves, shields or sections of framework to which it is bound. In such embodiments, the preform for the article and the thieves may be manufactured from a non-conductive material, which incorporates a catalyst for the electroless plating composition (at least at the surfaces of the thieve(s) and/or preform) to facilitate electroless plating of those items.

In other embodiments, the preform for an article and any thieves may be prepared by additive manufacturing from a conductive material or non-conductive material as a single object with any necessary sections of framework joining them (a preform-thieve-assembly). Any required shields and/or additional framework are prepared separately. The preform and thieves are treated with electroless plating compositions to render them conductive as necessary. After joining the preform-thief-assembly to any required shields and sections of framework to form an electroplatable assembly, the assembly is then subjected to electrodeposition of a coating. After electrodeposition of the coating on the article, it is separated from any thieves, shields or sections of framework to which it is bound. In such embodiments where the preform for the article and the thieves are manufactured from a non-conductive material it may incorporate a catalyst for the electroless plating composition (at least at the surfaces of the thieve(s) and/or preform) to facilitate electroless plating of those items.

In other embodiments, the preform for an article and any shields may be prepared by additive manufacturing from a conductive or non-conductive material as a single object with any necessary sections of framework joining them (a preform-shield-assembly). Any required thieves and/or additional sections of framework are prepared separately. The preform and thieves are treated with electroless plating compositions to render them conductive as necessary. After joining the preform-shield-assembly to any required thieves and sections of framework to form an electroplatable assembly, the assembly is subjected to electrodeposition of a coating. After electrodeposition of the coating on the article, it is separated from any thieves, shields or sections of framework to which it is bound. In such embodiments where the preform for the article and the thieves are manufactured from a non-conductive material it may incorporate a catalyst for the electroless plating composition (at least at the surfaces of the thieve(s) and/or preform) to facilitate electroless plating of those items.

In other embodiments, the preform for an article, any thieves, shields and framework may be prepared by additive manufacturing as a single object. All or part of the preform and thieves are prepared using a conductive material (e.g., a conductive polymer or metal). All or part of the shields and framework are prepared using a non-conductive material (e.g., a polymer). After joining the preform and any thieves, shields or framework to form an electroplatable assembly, the assembly is subjected to electrodeposition of a coating, after which the article is separated from any thieves, shields or sections of framework to which it is bound.

Further enumerate embodiments of the subject matter of the present disclosure follow:

1. A method of forming an article having an electrodeposited coating on all or part of the article comprising:
    preparing a preform for the article by additive manufacturing,
    preparing one or more thieves and/or one or more shields, optionally by additive manufacturing, the preform and one or more thieves and/or one or more shields to be assembled into an single electroplatable assembly;
    wherein the preform for the article and each thieve and/or shield comprises one or more surfaces (optionally comprising mating interfaces) that permit assembly of the preform with the thieves and/or shields into an electroplatable assembly in which the preform is oriented relative to each thief and shield present;
    joining the preform and the thieves and shields to each other and/or to a framework, the framework and all such parts optionally having mating interfaces that may be used to join the parts to the framework, to form the electroplatable assembly in which the preform, thieves and shields are oriented with respect to each other; and
    electrodepositing a composition comprising one or more elements (e.g., a metal or metals) onto the preform and any thieves that may be present to form all or part of the electrodeposited coating on all or part of the article's surface.

2. A method of forming an article having an electrodeposited coating on all or part of the article comprising:

preparing a preform-thieve-assembly by additive manufacturing in which the preform for the article is joined and oriented relative to each of one or more thieves (e.g., by direct contact and/or by one or more pieces of framework), and wherein the preform-thieve-assembly comprises one or more mating interfaces that permit assembly of the preform-thieve-assembly into an electroplatable assembly;

preparing one or more shields comprising one or more mating interfaces that permit assembly of the shields into the electroplatable assembly (optionally shields are prepared by additive manufacturing);

joining the preform-thieve-assembly and shields to each other and/or to a framework, the framework and each such part optionally comprising one or more mating interfaces, to form the electroplatable assembly in which the preform, thieves and shields are oriented with respect to each other; and electrodepositing a composition comprising one or more elements (e.g., a metal or metals) on to the preform and any thieves that may be present to form all or part of the electrodeposited coating on all or part of the article's surface.

3. A method of forming an article having an electrodeposited coating on all or part of the article comprising:

preparing a preform-shield-assembly by additive manufacturing in which the preform for the article is joined and oriented relative to each of one or more shields by one or more pieces of framework, and wherein the preform-shield-assembly optionally comprises one or more mating interfaces that permit assembly of the preform-shield-assembly into an electroplatable assembly;

preparing one or more thieves (optionally by additive manufacturing), that optionally comprising one or more mating interfaces that permit assembly of the thieves into the electroplatable assembly;

joining the preform-shield-assembly and thieves to each other and/or to a framework, the framework and each such part optionally comprising mating interfaces, to form the electroplatable assembly in which the preform, thieves and shields are oriented with respect to each other; and electrodepositing a composition comprising one or more elements (e.g., a metal or metals) onto the preform and any thieves that may be present to form all or part of the electrodeposited coating on all or part of the article's surface.

4. A method of forming an article having an electrodeposited coating on all or part of the article comprising:

preparing by additive manufacturing an electroplatable assembly comprising a preform for the article, one or more thieves, and/or one or more shields in which the preform for the article and each thief and shield present are joined, either by direct contact or by one or more sections of framework, and wherein the preform, and each thief and shield present are oriented relative to each other; and electrodepositing a composition comprising one or more elements (e.g., a metal or metals) onto the preform and any thieves that may be present to form all or part of the electrodeposited coating on all or part of the article's surface.

5. The method of any of embodiments 1-4, wherein electrodepositing a composition comprises contacting all or part of the electroplatable assembly with an electrolyte comprising one or more (e.g., two or more, three or more, or four or more) electroplatable species of metal ions.

6. The method of embodiment 5, wherein contacting all or part of the electroplatable assembly with an electrolyte comprises flowing the electrolyte over (against) one or more portions of the surface of the preform for the article where the electrodepositing is to form a coating on all or part of the article's surface.

7. The method of embodiment 6, wherein flowing is accomplished, at least in part, by agitation (e.g., using cyclic cathode/electroplatable assembly movement including movement at ultrasonic frequencies, with one or more stirrers, and/or with ultrasonic agitators).

8. The method of embodiment 6, wherein flowing the electrolyte is accomplished, at least in part, by pumping (forcing, moving, providing etc.) electrolyte through one or more non-conductive tube(s), such that electrolyte streaming from one or more openings in the non-conductive tube(s) results in flowing the electrolyte over one or more portions of the preform for the article.

9. The method of embodiment 6, wherein flowing the electrolyte is accomplished, at least in part, by pumping electrolyte through one or more passages within a section of framework and/or a shield, where the passages have one or more openings at a surface of the section of framework or a surface of the shield, such that electrolyte streaming from the openings results in flowing the electrolyte over one or more portions of the preform for the article.

10. The method of any of embodiments 6 to 9, wherein the article produced has a PTV that is less than a value selected from the group of 5%, 10%, 15%, 20%, 25%, 30%, 40%, 50%, 60%, 70%, 80%, 90% or 100%.

11. The method of any preceding embodiment further comprising masking any portion of the preform, or any section of framework and/or shield at one or more locations where the composition comprising one or more elements (e.g., a metal or metals) is not to be electrodeposited.

12. The method of any preceding embodiment wherein all or part of at least one section of frame joining the preform to one or more thieves (e.g., a thief) and/or all or part of at least one section of frame joining the preform to a shield is masked to electrodeposition to prevent reinforcing of the frame section by the electrodeposited coating.

13. The method of any preceding embodiment wherein one or more of the preform for the article, a framework section, one or more thieves (e.g., a thief), or one or more shields (e.g., a shield), which were prepared by additive manufacturing, is comprised of a non-conductive material.

14. The method of embodiment 13, wherein the preform for the article, and a framework section, and/or a thief is subject to electroless plating prior to the electrodepositing of a composition comprising one or more elements (e.g., a metal or metals) onto the preform.

15. The method of embodiment 13 or 14, wherein the nonconductive material is a polymer.

16. The method of embodiment 15, wherein the polymer comprises: polyetherimide (e.g., Ultem™), polyetherketoneketone (PEKK), polyether ether ketone (PEEK), nylon (e.g., Nylon 618), polyvinyl alcohol (PVA), acrylonitrile butadiene styrene (ABS), polycarbonate (PC), polylactic acid (PLA), PC/ABS, wood fiber (e.g., LAY-WOO-D3), polyphenylsulfone (PPSU) or a combination of one or more, two or more, or three or more of the foregoing.

17. The method of embodiment 16 wherein the polymer is a polyetherimide, polyetherketoneketone (PEKK), polyether ether ketone (PEEK), nylon, acrylonitrile butadiene styrene (ABS), polycarbonate (PC), polylactic acid (PLA), PC/ABS, polyphenylsulfone (PPSU), or a combination of one or more, two or more, or three or more of the foregoing.

18. The method of any of embodiments 13-17, wherein the preform for the article and/or one or more thieves comprises a non-conductive material that incorporates a catalyst for electroless plating.

19. The method of any preceding embodiment wherein one or more of the preform for the article, a framework section, or thieves (each of which may have been prepared by additive manufacturing), is comprised of a conductive material (e.g., at least the surface is comprised of a conductive material).

20. The method of embodiment 19, wherein said conductive material comprises:
    one or more metals;
    a non-conductive polymer and one or more metals (e.g., metal powders of fibers), graphite particles, graphite fibers, metal plated graphite particles (e.g. nickel plated graphite particles) or metal plated carbon fibers (e.g., nickel plated carbon fiber);
    a conductive polymer and one or more metals (e.g., metal powders of fibers), graphite particles, graphite fibers, metal plated graphite particles, or metal plated carbon fibers; or
    a conductive polymer.

21. The method of embodiment 19 or 20, wherein said one or more elements (e.g., a metal or metals) comprises one or more metals selected from the group consisting of: Ag, Al, Au, B, Be, C, Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn, Zr and alloys thereof.

22. The method of embodiment 20 or 21, wherein said conductive polymer comprises polyaniline or polypyrrole.

23. The method of any preceding embodiment, wherein electrodepositing a composition comprising one or more elements (e.g., a metal or metals) comprises:
    providing a bath including at least one electrodepositable component;
    contacting all or part of the preform with the bath; and
    applying voltage or current to the preform to deposit at least one electrodepositable component comprising one or more elements (e.g., a metal or metals).

24. The method according to embodiment 23, comprising providing a bath including at least two, at least three, or at least four electrodepositable components.

25. The method of embodiment 23 or embodiment 24, further comprising applying a time varying current density wherein the time varying current density oscillates at least for two cycles to deposit a structurally and/or compositionally modulated material on said preform.

26. The method of any preceding embodiment, wherein electrodepositing a composition comprising one or more elements (e.g., a metal or metals) comprises the electrodeposition of a composition comprising one or more, two or more, three or more, or four or more different elements independently selected from Ag, Al, Au, B, Be, C, Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn and Zr, wherein each of said independently selected elements is present at greater than 0.1, 0.05, 0.01, 0.005 or 0.001% by weight.

27. The method of any of embodiments 1-25, wherein electrodepositing a composition comprising one or more elements (e.g., a metal or metals) comprises the electrodeposition of a composition comprising two or more, three or more, or four or more different elements independently selected from Ag, Al, Au, B, Be, C, Co, Cr, Cu, Fe, Hg, In, Mg, Mn, Mo, Nb, Nd, Ni, P, Pd, Pt, Re, Rh, Sb, Sn, Mn, Pb, Ta, Ti, W, V, Zn and Zr, wherein each of said independently selected elements is present at greater than 0.01% by weight.

28. The method of embodiment 27, wherein said two or more, three or more, or four or more different elements comprise: Zn and Fe; Zn and Ni; Co and Ni; Ni and Fe; Ni and Cr; Cu and Zn; Cu and Sn; Ni, Co and P; Ni, Co, W and P; Ni, Co and W; Ni and W; Ni, W and P; Ni, Co and B; Ni, Co, W and B; or Ni, W and B.

29. The method according to any of embodiments 25-28, wherein the structurally and/or compositionally modulated material comprises at least one portion having a plurality of layers deposited with wavelengths between about 1 nm and about 250 nm, about 1 nm and about 25 nm, about 5 nm and about 50 nm, about 10 nm and about 75 nm, about 1 nm and about 100 nm, about 2 nm and about 200 nm, about 5 nm and about 225 nm, or about 10 nm and about 250 nm.

30. The method according to any of embodiments 25-28, wherein the structurally and/or compositionally modulated material comprises at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

31. The method of any of embodiments 1-30, wherein said composition comprising one or more elements comprises a plurality of first layers and second layers, which may have discrete or diffuse interfaces between the first and second layers, and which may be arranged as alternating first and second layers.

32. The method of embodiment 31, wherein said plurality of alternating first layers and second layers comprises two or more, three or more, four or more, six or more, eight or more, ten or more, twenty or more, forty or more, fifty or more, 100 or more, 200 or more, 500 or more, 1,000 or more, 1,500 or more, or 2,000 or more alternating first and second layers independently selected for each coating.

33. The method of any of embodiments 31-32, wherein each said first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%.

34. The method of any of embodiments 31-33, wherein each second layer comprises cobalt and/or chromium in a range independently selected from 1%-35%, 1%-3%, 2%-5%, 5%-10%, 10%-15%, 15%-20%, 20%-25%, 25%-30%, or 30%-35%.
35. The method of embodiment 33 or 34, wherein each said first layer comprises nickel in a range independently selected from 1%-5%, 5%-7%, 7%-10%, 10%,-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99% and the balance of one or more of first layers (e.g., each first layer) comprises cobalt and/or chromium.
36. The method of embodiment 34 or 35, wherein each second layer comprises cobalt and/or chromium in a range selected independently from 1%-35%, 1%-3%, 2%-5%, 5%-10%, 10%-15%, 15%-20%, 20%-25%, 25%-30%, or 30%-35% and the balance of one or more second layers (e.g., each second layer) comprises nickel.
37. The method of any of embodiments 31-36, wherein one or more of said first and/or second layers comprises one or more, two or more, three or more, or four or more elements selected independently for each first and second layer from the group consisting of Ag, Al, Au, B, Be, C, Cr, Cu, Fe, Hg, In, Mg, Mn, Mo, Nb, Nd, P, Pd, Pt, Re, Rh, Sb, Si, Sn, Pb, Ta, Ti, W, V, Zn and Zr.
38. The method of any of embodiments 31-37, wherein each said first layer comprises nickel in a range independently selected from 1%-5%, 5%-7%, 7%-10%, 10%,-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99% and the balance of one or more first layers (e.g., each first layer) comprises iron.
39. The method of any of embodiments 31-38, wherein each second layer comprises iron in a range independently selected from 1%-35%, 1%-3%, 2%-5%, 5%-10%, 10%-15%, 15%-20%, 20%-25%, 25%-30%, or 30%-35% and the balance of one or more second layers (e.g., each second layer) comprises nickel.
40. The method of any of embodiments 1-39, further comprising separating the article from the framework, thieves and shields following the electrodeposition.
41. An article produced by the method of any of embodiments 1-40.
42. The article of embodiment 41, wherein said article has a property selected from the group consisting of hardness and/or toughness that is greater than that of said preform.
43. The article of embodiment 41, wherein said electrodeposited composition is comprised of NiCo and has a microhardness of at least about 400 Vickers units measured according to ASTM (American Society for Testing and Materials) E384-11e1.
44. The article of embodiment 41, wherein said electrodeposited composition is comprised of nickel and chromium and has a microhardness of at least about 500 Vickers units measured according to ASTM E384-11e1.
45. The article of embodiment 41, wherein said electrodeposited composition comprises a plurality of layers and displays Hall-Petch hardening relative to a homogeneous electrodeposited composition having the average composition and substantially the same thickness of the plurality of layers.
46. The article of any of embodiments 41-45, wherein said electrodeposited composition comprises a plurality of layers and displays Hall-Petch strengthening relative to a homogeneous electrodeposited composition having the average composition and substantially the same thickness of the plurality of layers.
47. The article of embodiment 41, wherein said electrodeposited composition comprises a plurality of layers and displays Koehler toughening relative to a homogeneous electrodeposited composition having the average composition and substantially the same thickness of the plurality of layers.
48. The article of any of embodiments 41-47, wherein the PTV is less than: 5%, 10%, 15%, 20%, 25%, 30%, 40%, 50%, 60%, 70%, 80%, 90% or 100%.
49. The article of any of embodiments 41-47, wherein the PTV is within a range selected from the group of from 0-5%, 5-10%, 10-15%, 15-20%, 20-25%, 25-30%, 30-40%, 40-50%, 50-60%, 60-70%, 70-80%, 80-90% and 90-100%.
50. The article of any of embodiments 41-49, wherein the PCV of at least one chemical element is less than one of the following: 5%, 10%, 15%, 20%, 25%, 30%, 40%, 50%, 60%, 70%, 80%, 90% or 100%.
51. The article of embodiment 50, wherein the PCV of a second chemical element is less than one of the following: 5%, 10%, 15%, 20%, 25%, 30%, 40%, 50%, 60%, 70%, 80%, 90% or 100%.
52. The article of embodiment 51, wherein the PCV of a third chemical element is less than one of the following: 5%, 10%, 15%, 20%, 25%, 30%, 40%, 50%, 60%, 70%, 80%, 90% or 100%.
53. The article of embodiment 52, wherein the PCV of a fourth chemical element is less than one of the following: 5%, 10%, 15%, 20%, 25%, 30%, 40%, 50%, 60%, 70%, 80%, 90% or 100%.
54. The article of any of embodiments 41-49, wherein the PCV of at least one chemical element is within a range selected from the group of from 0-5%, 5-10%, 10-15%, 15-20%, 20-25%, 25-30%, 30-40%, 40-50%, 50-60%, 60-70%, 70-80%, 80-90% and 90-100%.
55. The article of embodiment 54, wherein the PCV of a second chemical element is within a range selected from the group of from 0-5%, 5-10%, 10-15%, 15-20%, 20-25%, 25-30%, 30-40%, 40-50%, 50-60%, 60-70%, 70-80%, 80-90% and 90-100%.
56. The article of embodiment 55, wherein the PCV of a third chemical element is within a range selected from the group of from 0-5%, 5-10%, 10-15%, 15-20%, 20-25%, 25-30%, 30-40%, 40-50%, 50-60%, 60-70%, 70-80%, 80-90% and 90-100%.
57. The article of embodiment 56, wherein the PCV of a fourth chemical element is within a range selected from the group of from 0-5%, 5-10%, 10-15%, 15-20%, 20-25%, 25-30%, 30-40%, 40-50%, 50-60%, 60-70%, 70-80%, 80-90% and 90-100%.

7.0 EXAMPLES

Example 1 Additive Manufacturing of Nanolaminated Nickel—Iron Plated Wrenches

Wrenches were prepared from ABS preforms prepared using FDM. Wrenches were prepared at two different FDM printing densities with a first set of wrenches having smaller beads deposited in the FDM process than the second set. The preforms were chromate etched and subjected to electroless nickel plating to render the preforms conductive. A 100 micron coating of nanolaminated Ni—Fe having alternating layers of 70% Ni-30% Fe and 90% Ni-10% Fe (about 100 nm each) was electrodeposited. The coated articles produced by this process had a bright finish that appeared self-leveling, and which appeared to adhere well. The wrenches with the larger bead structure in the printed preform were larger and more rigid, but the larger bead prevented effective infiltration of the plastic preform.

Example 2 Additive Manufacturing of Nanolaminated Nickel—Iron Plated Wrenches and Complex Parts Wrenches, an unmanned aerial vehicle propeller and wing, a honeycomb speaker cover, corrugated articles and plastic structures with "teeth", and small air ducts from airplanes were prepared from ABS preforms prepared using FDM. A preform in the shape of a plastic dome with an internal truss structure was prepared from Ultem™. The preforms were chromate etched and subjected to electroless nickel plating to render them conductive. A 100 micron coating of nanolaminated Ni—Fe having alternating layers of 70% Ni-30% Fe and 90% Ni-10% Fe (about 100 nm each) was electrodeposited. The coated articles produced by this process had a bright finish that appeared self-leveling, and which appeared to adhere well. The wrenches with the larger bead structure in the printed preform were larger and more rigid, but the larger bead prevented effective infiltration of the plastic preform. These articles demonstrate the complexity of parts that can be prepared and the efficient coverage and adhesion of the nanolaminate coatings to the preforms. The dome and the wing and propeller show coating uniformity over complex surfaces.

Example 3 Additive Manufacturing of Nanolaminated Nickel—Iron Plated Wrenches Two styles of wrenches were produced from ABS preforms prepared using FDM. The preforms were chromate etched and subjected to electroless nickel plating to render the preforms conductive. A target thickness of 100 microns of nanolaminated Ni—Fe coating having alternating layers of 70% Ni-30% Fe and 90% Ni-10% Fe (about 100 nm each) was electrodeposited. As in Example 1, the coated articles produced by this process had a bright finish that appeared self-leveling, and which appeared to adhere well. The wrenches with the larger bead structure in the printed preform were larger and more rigid, but the larger bead prevented effective infiltration of the plastic preform.

Both wrench styles were tested for their ability to withstand torque relative to unplated ABS preforms. Both wrenches plated with the nanolaminate Ni—Fe coatings resulted in lower breaking points than the uncoated plastic preforms. This lower breaking point was attributed to the electroless-nickel process embrittling the plastic, a failure to achieve a full coating thickness, and other factors including a failure of the metal to infiltrate the "weave" of the ABS preform.

Example 4 Additive Manufacturing of Nanolaminated Nickel—Iron Plated Truss and Honeycomb Structures Stereolithography was used to prepare rapid prototype honeycomb and preform structures from a combination of nylon 11 and nylon 12 with and without added graphite. Both the graphite containing and graphite free preforms were chromate etched and subjected to electroless nickel plating to render the preforms conductive. A 100 micron coating of nanolaminated Ni—Fe coating having alternating layers of 70% Ni-30% Fe and 90% Ni-10% Fe (about 100 nm each) was electrodeposited. The preparation of these articles demonstrates that preforms suitable for electrodeposition of nanolaminate alloys may be prepared by stereolithography. The truss structure also demonstrates that localized strength and tensile properties can be designed or added into parts with minimal surface area sacrificed. The use of rapid preform preparation in the process allows for a responsive adjustment to the need for improved part performance based on testing results without requiring complete redesign and reforming of plastic substrate.

Example 5 Additive Manufacturing of Nanolaminated Nickel—Iron Plated I-Beam

Stereolithography was used to prepare a preform for an I-beam support and the wiring run supports from graphite filled nylon 12. The preforms were chromate etched and subjected to electroless nickel plating to render the preforms conductive. A 100 micron coating of nanolaminated Ni—Fe with alternating layers of 70% Ni-30% Fe and 90% Ni-10% Fe (about 100 nm each) was electrodeposited. The preparation of these articles demonstrates that stereolithography can be used to prepare preforms.

The invention claimed is:

1. A method of forming an article with an electrodeposited coating, the method comprising:
   preparing an electroplatable assembly by an additive manufacturing method selected from the group consisting of three-dimensional printing, selective laser sintering, sintering laser melting, fused deposition modeling, and stereolithography, the electroplatable assembly comprising a preform for the article and a thief and/or a shield, which are joined by direct contact or by respective sections of framework, wherein the preform and the thief and/or the shield are oriented relative to each other; and
   forming the electrodeposited coating on at least a portion of a surface of the preform by electrodepositing a composition comprising one or more elements onto the preform.

2. The method of claim 1, wherein the electrodepositing the composition comprises contacting at least a portion of the electroplatable assembly with an electrolyte comprising one or more electroplatable species of metal ions.

3. The method of claim 2, wherein the contacting at least the portion of the electroplatable assembly with the electrolyte comprises flowing the electrolyte over or against at least the portion of the surface of the preform.

4. The method of claim 3, wherein the flowing comprises:
   agitation;
   pumping electrolyte through one or more non-conductive tubes; or
   pumping the electrolyte through one or more passages within a section of framework of the respective sections of framework and/or the shield.

5. The method of claim 3, wherein the article produced has a percent thickness variation (PTV) that is less than 100%.

6. The method of claim 1, wherein one or more of the preform, a section of framework of the respective sections of framework, the thief, or the shield comprises a non-conductive material.

7. The method of claim 6, wherein the preform the section of framework, and/or the thief is subject to electroless plating prior to the electrodepositing of the composition onto the preform.

8. The method of claim 7, wherein the non-conductive material is a polymer.

9. The method of claim 8, wherein the polymer comprises: polyetherimide, polyetherketoneketone (PEKK), polyether ether ketone (PEEK), nylon, polyvinyl alcohol (PVA), acrylonitrile butadiene styrene (ABS), polycarbonate (PC), polylactic acid (PLA), PC/ABS, wood fiber, polyphenylsulfone (PPSU) or a combination thereof.

10. The method of claim 6, wherein the preform and/or the thief comprise the non-conductive material, and wherein the non-conductive material incorporates a catalyst for electroless plating.

11. The method of claim 1, wherein one or more of the preform, a section of the respective sections of framework, or the thief comprises a conductive material that comprises:
one or more metals;
a non-conductive polymer and one or more metals, graphite particles, graphite fibers, metal plated graphite particles or metal plated carbon fibers;
a conductive polymer and one or more metals, graphite particles, graphite fibers, metal plated graphite particles, or metal plated carbon fibers; or
a conductive polymer.

12. The method according to claim 1, wherein the electrodeposited coating comprises a structurally and/or compositionally modulated material that comprises a plurality of layers with wavelengths between about 1 nm and about 250 nm.

13. The method of claim 1, wherein the electrodeposited coating comprises a plurality of first layers and second layers arranged as alternating first and second layers.

14. The method of claim 13, wherein the plurality of alternating first layers and second layers comprises four or more alternating first and second layers.

15. The method of claim 1, further comprising separating the article from the respective sections of framework, the thief, and the shield following the electrodepositing.

16. The method of claim 1, wherein preparing the electroplatable assembly comprises:
preparing the preform for the article, the thief and/or the shield;
wherein the preform, the thief, and/or the shield is prepared by the additive manufacturing method;
wherein the preform, the thief, and/or the shield each comprise a mating interface that permits assembly of the preform with the thief and/or the shield into the electroplatable assembly in which the preform is oriented relative to the thief and/or the shield; and
forming the electroplatable assembly comprising joining the preform and the thief and/or the shield to each other and/or to the respective sections of framework, which comprise corresponding mating interfaces that correspond to the mating interfaces, wherein the preform is oriented relative to the thief and/or the shield, which are oriented with respect to each other in the electroplatable assembly.

17. The method of claim 16, wherein preparing the electroplatable assembly comprises:
preparing a preform-thieve-assembly in which the preform is joined and oriented relative to the thief by the respective sections of framework, wherein the preform-thieve-assembly comprises the mating interface;
preparing the shield which comprises an additional mating interface; and
forming the electroplatable assembly comprising joining the preform-thieve-assembly and the shield to each other and/or to the respective sections of framework.

18. The method of claim 16, wherein preparing the electroplatable assembly comprises:
preparing a preform-shield-assembly in which the preform is joined and oriented relative to the shield by a section of the respective sections of framework, wherein the preform-shield-assembly comprises the mating interface;
preparing the thief which comprises an additional mating interface; and
forming the electroplatable assembly comprising joining the preform-shield-assembly and the thief to each other and/or to the respective sections of framework.

19. The method of claim 13, wherein the electrodeposited coating further comprises one or more additional layers between a first layer and a second layer of the plurality of alternating first and second layers.

20. The method of claim 1, wherein the electroplatable assembly comprises:
a plurality of thieves that comprises the thief; and/or
a plurality of shields that comprises the shield,
wherein the preform and each thief of the plurality of thieves and/or each shield of the plurality of shields is oriented relative to each other.

* * * * *